(12) United States Patent
Grice

(10) Patent No.: US 10,905,979 B2
(45) Date of Patent: Feb. 2, 2021

(54) PORTABLE FILTRATION APPARATUS, SYSTEMS AND METHODS

(71) Applicant: PRECISION DEWATERING, LLC, Coral Gables, FL (US)

(72) Inventor: Steven Grice, Eau Claire, WI (US)

(73) Assignee: Precision Dewatering, LLC, Coral Gables, FL (US)

( * ) Notice: Subject to any disclaimer, the term of this patent is extended or adjusted under 35 U.S.C. 154(b) by 0 days.

(21) Appl. No.: 16/527,891

(22) Filed: Jul. 31, 2019

(65) Prior Publication Data

US 2020/0276526 A1 Sep. 3, 2020

Related U.S. Application Data

(63) Continuation-in-part of application No. 16/290,038, filed on Mar. 1, 2019, now Pat. No. 10,625,185.

(51) Int. Cl.
 *B01D 29/27* (2006.01)
 *B01D 24/22* (2006.01)
 *B01D 29/11* (2006.01)
 *B01D 29/56* (2006.01)

(52) U.S. Cl.
 CPC ............ *B01D 29/27* (2013.01); *B01D 24/22* (2013.01); *B01D 29/111* (2013.01); *B01D 29/56* (2013.01)

(58) Field of Classification Search
 None
 See application file for complete search history.

(56) References Cited

U.S. PATENT DOCUMENTS

| 10,625,185 B1* | 4/2020 | Grice | B01D 29/27 |
|---|---|---|---|
| 2007/0284312 A1* | 12/2007 | Lough | C02F 1/001 |
| | | | 210/724 |
| 2014/0341652 A1* | 11/2014 | Besseling | B09C 1/00 |
| | | | 405/50 |
| 2020/0276526 A1* | 9/2020 | Grice | B01D 29/56 |

FOREIGN PATENT DOCUMENTS

WO WO-9429230 A1 * 12/1994 ............ C02F 11/128

\* cited by examiner

*Primary Examiner* — Robert J Popovics
(74) *Attorney, Agent, or Firm* — Anthony J. Bourget

(57) ABSTRACT

Methods, apparatuses and systems for treating liquid utilizing primary and secondary treatment mechanisms positioned on a portable sled, the primary treatment mechanism of the system being a filter bag used in conjunction with a secondary treatment mechanism including a straw bale layer positioned on a base of the sled. Liquid entering the filter bag exits the bag as filtrate which passes through the secondary treatment mechanism and flows by gravity to the environment. The system is transportable to different locations where filtering may continue utilizing the same filter bag. The filter bag is flexible and removable via a porous lift frame positioned below the filter bag.

29 Claims, 22 Drawing Sheets

PORTABLE FILTRATION APPARATUS, SYSTEMS AND METHODS

CROSS-REFERENCE TO RELATED APPLICATIONS

This application is a Continuation-in-Part of, and claims the benefit and priority to, U.S. patent application Ser. No. 16/290,038 filed Mar. 1, 2019 for Portable Filtration Apparatus, Systems and Methods, incorporated herein by reference in its entirety for continuity of disclosure.

BACKGROUND OF THE INVENTION

1. Field of the Invention

This invention relates to the field of filtering apparatuses, systems and methods, and more particularly to apparatuses, systems and methods for filtering of water at construction sites and other locations to be dewatered.

2. Background Information

Dewatering systems are utilized in various industrial areas and construction sites. Dewatering systems are meant to remove water from certain areas, for instance from a hole or pond located at a construction site. If rain water or other liquid happens to fill an area of a construction zone or even within structures or containers, the unwanted fluid is removed or the area is "dewatered." During a dewatering process particles or unwanted materials or sludge, fines, contaminants or the like are often mixed with the water or fluid. There are rules and regulations on how to handle such removed water so that the particulate matter or contaminants are not introduced or re-introduced into the removed water or sites. The water run-off may be dirty and contain unwanted particulate material or contaminants or pollution. In some cases regulations require the water to be filtered before it is returned to the location or to nearby waterways. In some instances a dewatering pond or holding basin is constructed around a filter bag for the purposes of dewatering a construction area. For instance, the dewatered water is introduced into a filter bag which is surrounded by a secondary containment structure. As the water exits the filter bag the sludge or dirt or other matter is captured inside the bag. The exiting water is further contained, at least partially, by the secondary containment mechanism. In some aspects the secondary containment mechanism includes a ring of straw bales, i.e., straw bales are placed end-to-end on the ground and encircling the filter bag. The water will pass through the secondary containment (where further filtering of the water may or may not transpire) and flow to surrounding or adjacent lands or waterways or ponds.

FIG. 15 and FIG. 16 depict one example of a prior art system. The management and construction of such systems are or can be very expensive, time consuming and only of limited or one-time use. Construction of the systems typically cause delay in construction, especially when constructing pipeline facilities. The planning and location of such systems also often require permits or approvals and a knowledge of the state, local and federal water runoff, pollution and dewatering regulations. Such systems are labor intensive, and costly, especially if mistakes are made or in the case of a faulty containment system.

While the foregoing are attempts to provide effective dewatering systems and have certain benefits, there is room for improvement.

SUMMARY OF THE INVENTION

In one aspect the invention pertains to a portable filtration system comprising a sled or apparatus upon which is positioned a filter bag to receive the dewatered water. The apparatus includes a secondary containment feature including filter medium and a porous exterior fence through which the water escapes and flows to the ground or waterway surrounding or adjacent the apparatus. The filter medium, such as straw bales or core logs, is contained in a channel defined in part by an interior porous fence and the exterior porous fence, and where the interior fence encloses the filter bag. In operation the dewatered water is supplied to the filter bag where a filtrate of the water exits the bag traveling through the porous interior fence, through the filter medium of the secondary contentment, and through the exterior fence. When the filter bag fills with material, the bag is replaced. The system includes hooks and lift mechanisms so that it may be easily transported from a first constriction site to a second construction site for dewatering and filtering.

In a further aspect the invention includes a portable water filtration apparatus having a base, an exterior porous fence extending from the base and bounding a major internal area, and an interior porous fence extending from the base and bounding a minor internal area. The base, exterior fence and interior fence define a filter medium placement channel configured to receive a filter medium. The filter medium includes a straw bale or filter core log, for instance, and wraps around a filter bag positionable within the minor internal area and enclosed by the interior fence.

In a further aspect the invention includes a method of treating liquids including receiving liquid within a filter bag positioned upon a base within an interior fence of a portable sled, passing first filtrate from the bag through the interior fence and through a secondary containment channel having a filter medium to form a second filtrate, the second filtrate passing through an exterior porous fence connected to the portable sled. In further aspects the method includes transporting the portable sled from a first construction site location to a second construction site location while the filter bag is retained within the interior fence.

In a further aspect the invention includes methods, apparatuses and systems for treating liquid utilizing primary and secondary treatment mechanisms positioned on a portable sled or trailer, the primary treatment mechanism of the system being a filter bag used in conjunction with a secondary treatment mechanism such as a straw bale layer positioned on a base of the sled. Liquid entering the filter bag exits the bag as filtrate which passes through the secondary treatment mechanism and flows by gravity to the environment. In one aspect the base is a porous base allowing the filtrate to flow therethrough. In further aspects the filter bag is positioned above a porous lift frame configured to lift the filter bag. The system is transportable to different locations where filtering may continue utilizing the same filter bag.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

FIG. 26A is a perspective view of a prior art Example Bale for use in association with the present invention.

Figure 1:
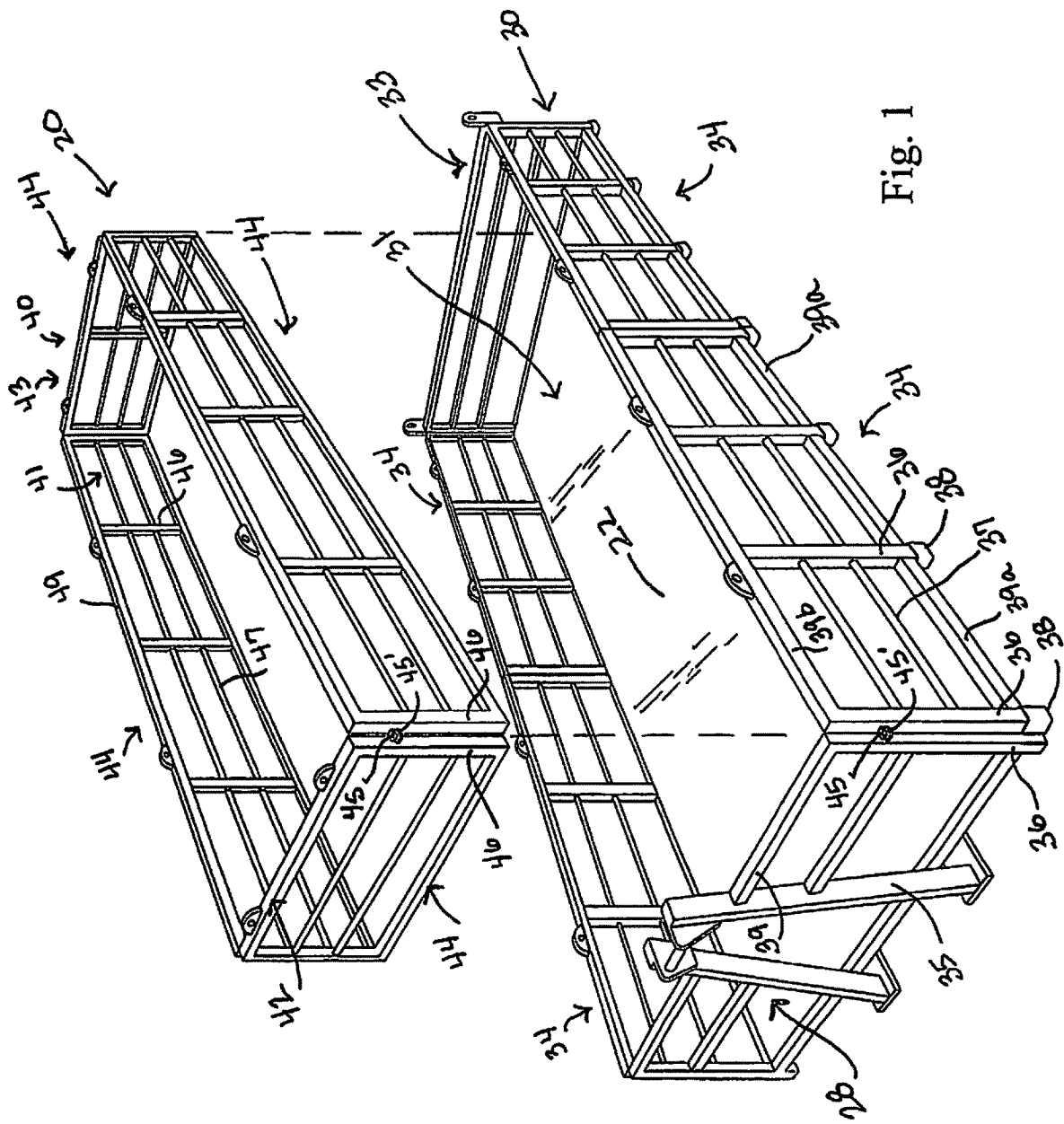
FIG. 1 is an exploded perspective view of an apparatus made in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-27, aspects of the apparatuses, systems and methods are shown. FIG. 1 is an exploded perspective view of one aspect of an apparatus or portable sled 20 in accordance with the invention. Apparatus or portable sled 20 includes a base 22 upon which is connected an exterior fence 30. Exterior fence 30 bounds a major internal area 31. An interior fence 40 is configured to be positioned within fence 30 at the major internal area 31. Interior fence 40 bounds a minor internal area 41. In this aspect base 22 includes a rectangular planar structure with fence 30 positioned around a perimeter of the base 22. Fence 30, or a portion of fence 30 is removable from base 22. In one aspect sled 20 includes a front fence segment 32 which is rigidly connected to base 22 and is not removable. Fence 30 includes a series of external fence segments 34 which in one aspect are removably attached to base 22. In one aspect segments 34 have posts 36 which insert into sockets 38. The sockets 38 are mounted to base 22 using gussets or other securing structure. The sockets 38 include a through hole 38' into which securing bolts may be inserted to secure the posts 36 into position. Matching through holes are included within the posts 36 for securing the posts with the bolts in the sockets 38. In alternatives the segments 34 may be welded or permanently secured to base 22. In one aspect exterior fence 30 and segments 34 include horizontal structures, such as slats or rods or rungs 37 which span between respective posts 36. Fence 30 and segments 34 in one aspect also include bottom rails 39 and top rails 39. The posts 36, rungs 37 and rails 39 form a porous fence structure or segments 34. Segments 34 have sufficient structure to hold filter media (described below) while also allowing liquids such as water to pass therethrough. Different types or configurations of fence structures may be used, provided there is sufficient space to allow liquids to pass through the segments 34. In the example, segments 34 are made of metal, such as steel or other metals. Other materials may also be used to create segments 34.

Sled 20 includes an interior fence 40 positioned upon base 22 and within the major internal area 31. Interior fence 40 bounds a minor internal area 41. Fence 40 includes interior fence segments 44 which connect together in a generally rectangular configuration. In one aspect interior fence segments 44 include posts 46 and rungs 47 and rails 49 to create a porous fence-like structure. Fence segments 44 have sufficient structure to hold filter media (described below) while also allowing liquids such as water to pass through the segments 44. Different types of fence structures may be used. In the example, segments 44 are made of metal, such as steel or other metals. Other materials may also be used to create segments 44. In one aspect fence segments 44 include ears 45, 45' connected to adjacent posts 46. Ears 45, 45' overlap such that a hitch pin inserts into a hole aligned through the layered ears 45, 45'. The hitch pin secures adjacent segments 44 together. In one aspect a set of ears 45, 45' may be positioned at an upper portion of adjacent segments 44, and another set of ears 45, 45' (or still further sets) are positioned at a lower portion of the adjacent segments 44 for a stable connection. Ears 45 are made of metal and welded to posts 46 in one example. With hitch pins secured through all sets of ears 45, 45' of adjacent segments 44, fence 40 is a stand-alone structure which may be picked and placed upon sled 20. Fence 40 is free to slide about the major internal area 31. Fence 40 may also be assembled into position upon sled 20 by connecting adjacent segments 44 with respective hitch pins through ears 45, 45'. In one aspect fence 40 has an open top and bottom. The same or similar ears 45, 45' are and can be connected to posts 36 of exterior fence 30. Specifically, adjacent segments 34 include respective ears 45 which receive hitch pins secured through holes within the overlapped ears 45, 45'.

Figure 2:
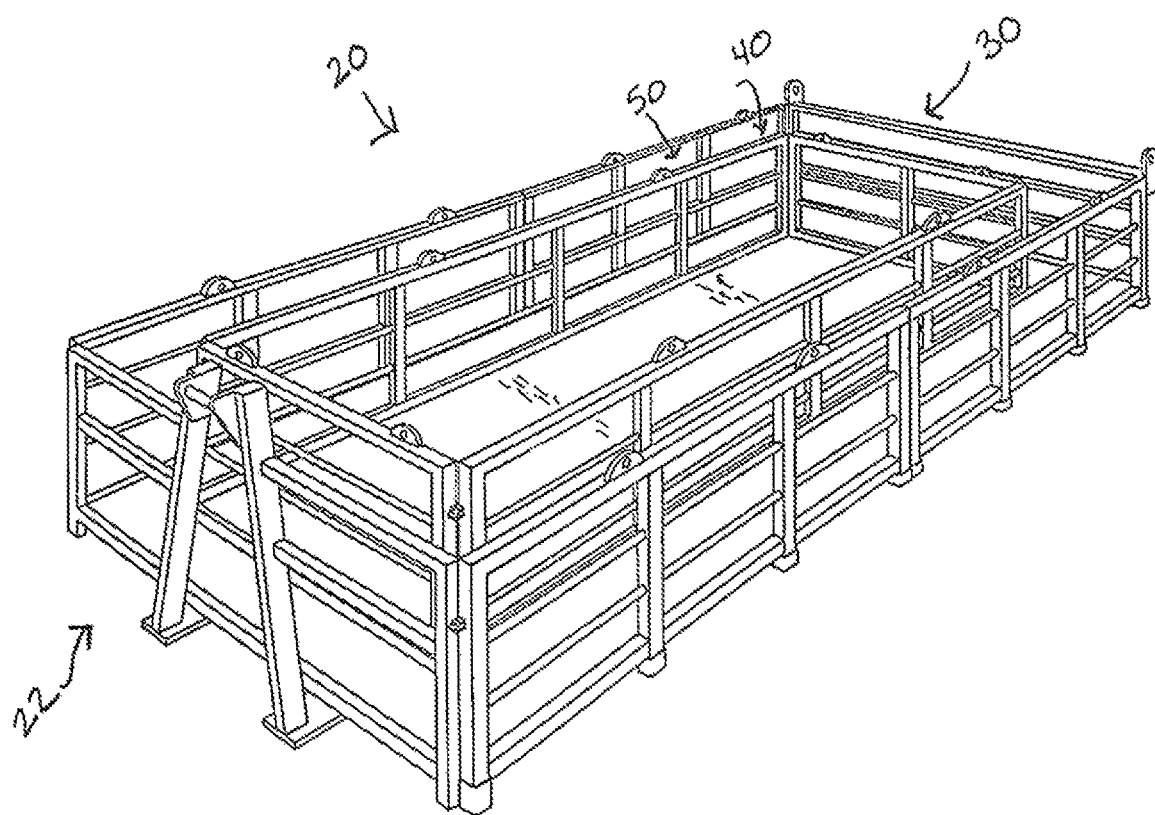
FIG. 2 is a front perspective view of the apparatus shown in FIG. 1 with components combined.
Figure 3:
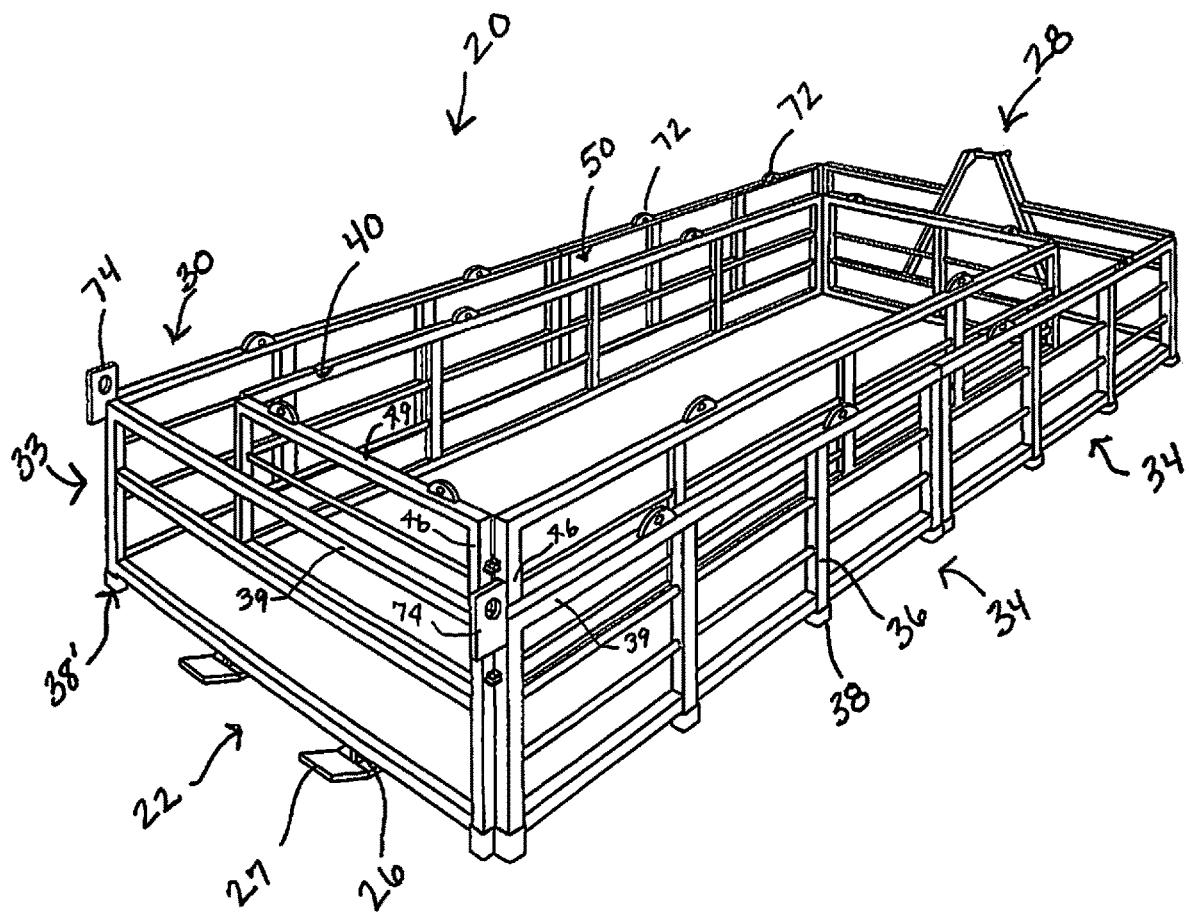
FIG. 3 is a rear perspective view of the apparatus shown in FIG. 2.
Figure 4:
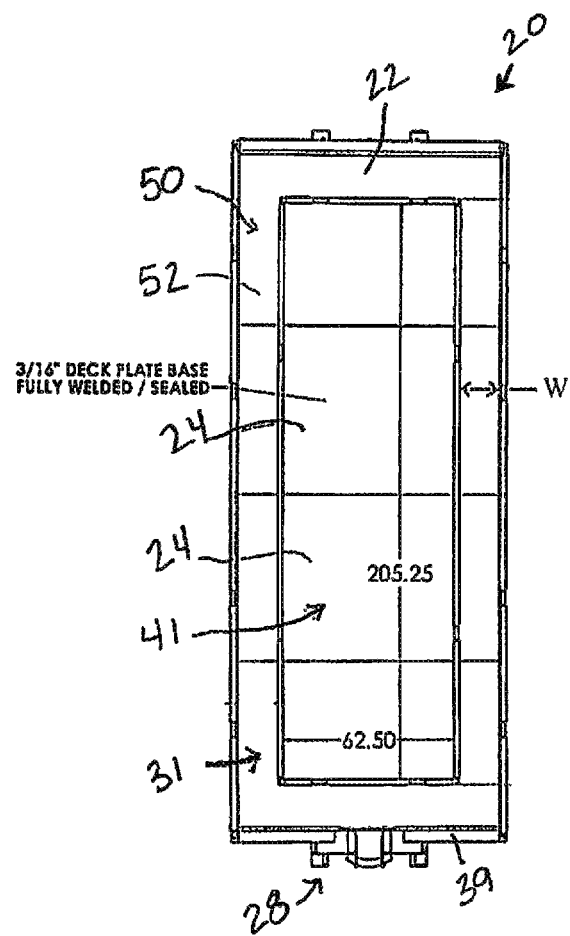
FIG. 4 is a top view of the apparatus shown in FIG. 2.

FIG. 2 and FIG. 3 show perspective views of the apparatus or sled 20. Fence 40 is shown positioned upon base 22 within fence 30. Fence 40, base 22 and fence 30 define a channel 50. Channel 50 is a filter medium placement channel configured to receive a filter medium 60. In one aspect fence 40 is set upon or rests by gravity upon base 22. In this manner fence 40 is free to be repositioned about base 22 within major internal area 31 and may slide or be slid upon base 22. In other aspects fence 40 is secured to base 22 and/or to fence 30; however, such securing is not always necessary or desired. Having fence 40 unsecured and simply resting upon base 22 allows for ease in placement of filter media 60 within the channel 50 as described below. In one aspect fence 40 is configured such that the channel 50 forms a margin 52 around or about the base 22. The margin 52 has a footprint or area corresponding to the width between fence 30 and fence 40. As shown in FIG. 4, the margin 52 of channel 50 is generally rectangular shaped and is positioned at the perimeter or along the perimeter of base 22. In one aspect fence 40 is configured such that the channel 50 has a width "W" which is uniform or substantially uniform throughout the entire margin 52. In one aspect the width "W" is uniform throughout the channel 50 as channel 50 spans a length of sled 20 and as channel 50 spans a width of the sled 20. Such uniform width W accommodates for efficient insertion of filter medium 60 noted below.

FIG. 4 shows base 22 which provides a sealed foundation for securing fence 30. In one aspect base 22 is comprised of metal base segments 24 which in one aspect are welded together and sealed. In one aspect four steel segments 24 comprise base 22. Base 22 is sealed such that water is not able to pass through base 22. Sockets 28 are attached at a perimeter of base 22 for holding segments 34 of fence 30. In one aspect the sockets 28 are welded to and extend from the base 22. The sockets 28 in one aspect hang off a perimeter edge of the base 22. Front segment 32 is permanently connected to base 22.

Figure 5:
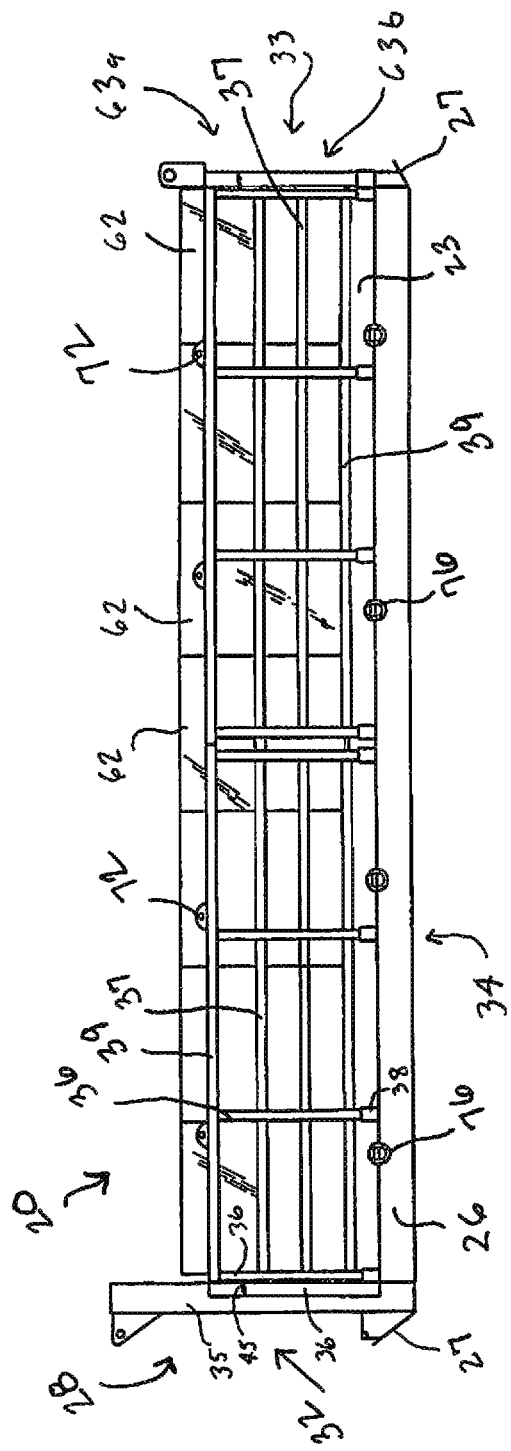
FIG. 5 is a right side view of the apparatus of FIG. 2 and containing filter medium.
Figure 6:
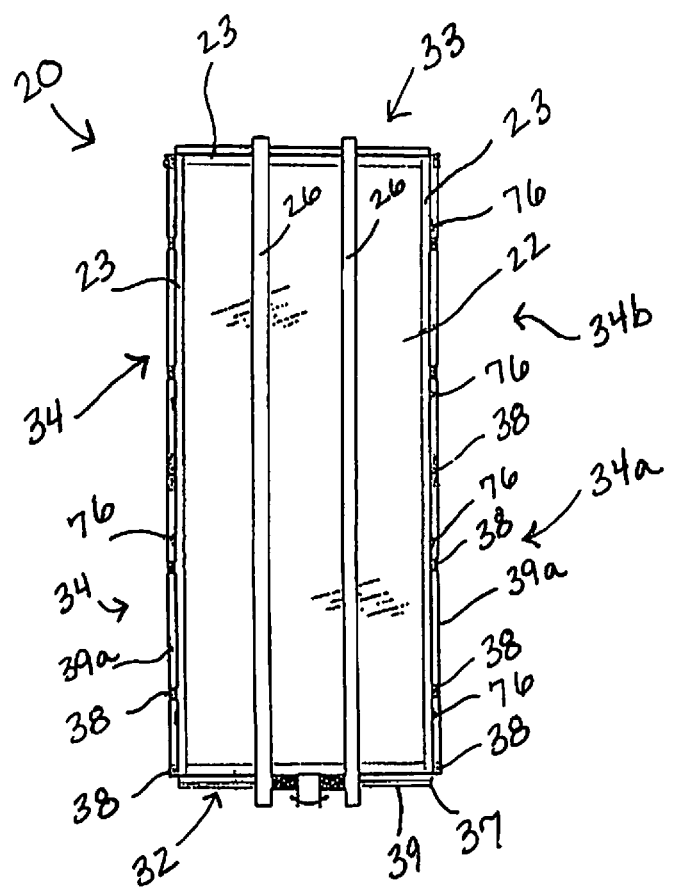
FIG. 6 is a bottom view of the apparatus of FIG. 2.

FIG. 5 is a right side view of sled 20 and FIG. 6 is a bottom view of sled 20. FIGS. 5 and 6 show sled 20 having skids 26 positioned below base 22. Skids 26 provide structural support to sled 20 and also allow sled 20 to slide upon the ground or other surface. Skids 26 include angled feet 27 to provide ease of sliding. Rollers may also be connected to skids or to the base 22 to allow for roll-off delivery and pickup of sled 20. A lift tongue 28 is provided at front segment 32 to accommodate lifting of sled via a hydraulic arm. A hydraulic arm is received at tongue 28 for lifting as is commonly accomplished in the lifting of dumpsters and other equipment having the same or similar tongue 28. Other lifting structures may also be used at front segment 32. Front segment 32 includes angled struts 35 and rails 39 and posts and rungs for structural support. A bottom side of sled 20 shown in FIG. 6 shows sockets 28 connected to base 22 with segments 34 positioned at the perimeter of sled having posts 36 inserted into socket 28. In the example shown (FIG. 5), segment 34a includes four posts which insert into four respective sockets 28. Bottom rail 39a (FIG. 6) is shown spanning between adjacent sockets 28. Another segment 34b also includes four posts inserted into four respective sockets 28 and aligned adjacent first segment 34a. Additional segments 34 and back segment 33 are inserted into the opposite side of the sled 20 as shown in FIG. 6 to create fence 30. In one aspect base 22 includes base rails 23 which outline a perimeter of base. The base rails 23 extend downward from and are welded to base segments 24. The sockets 38 are welded to base rails 23 in one aspect. Lift rings 76 are also attached or welded to base rails 23 at various points about the perimeter of base. The lift rings allow for connection to a cable or other mechanism for transport of sled 20 such as by sliding or lifting. The angled struts 35 of front segment 32 are connected or welded to base rail 23.

Figure 7:
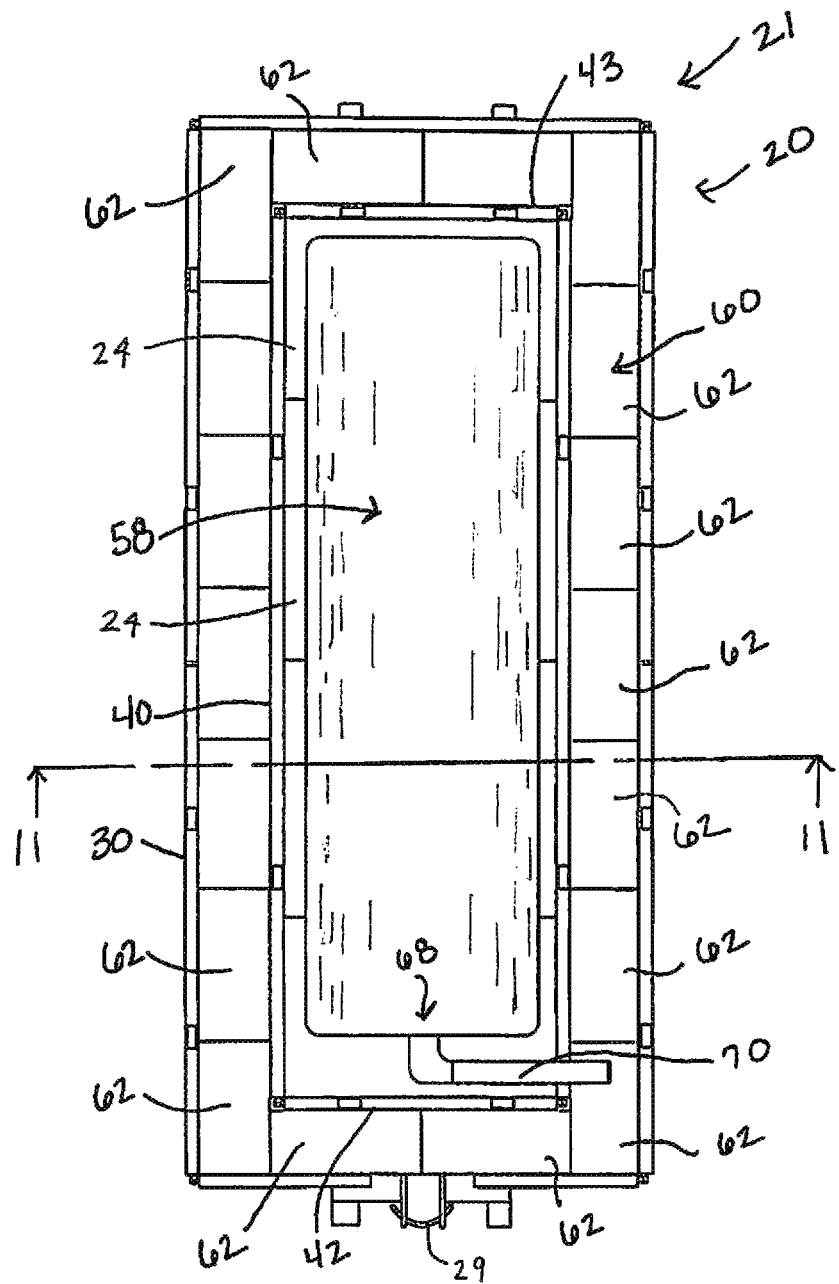
FIG. 7 is a top view the apparatus of FIG. 2 and of a system aspect in accordance with the present invention.

FIG. 7 is a top view of a system 21 aspect of the invention. System 21 also depicts partial operation of a method of treating liquids. System 21 includes sled 20 in which is positioned a filter bag 58. Filter bag 58 is made of a filter material formed into a shape of a bag as is commonly used in dewatering operations. Bag 58 includes an inlet 68 into which piping 70 or a tube is inserted to supply liquids, such as water or dirty water having silt and/or particles and/or other materials to be separated or filtered from the liquid/water. As shown in FIG. 7, bag 58 is positioned within interior fence 40 and minor internal area 41. Filter bag 58 is constructed and situated such that it does not contact fence 40. The piping 70 connects to inlet 68 and runs outward from sled 20 to a supply. The supply may include a water source and a pump. The water source is typically the water to be removed from a construction site or other area, such as a pond or puddles or other pooled water. The water is removed so that work may be accomplished at the site. Removal of the water often results in removal of water containing sediments or particles which are to be filtered before the water is returned to the construction site or other areas.

Also shown in FIG. 7 is filter medium 60, such as straw bales 62. Filter medium 60 or straw bales 62 in this aspect are inserted into channel 50 which surrounds filter bag 58. In the example shown in FIG. 7, two columns of 7 bales and two rows of two bales are depicted.

Figure 8:
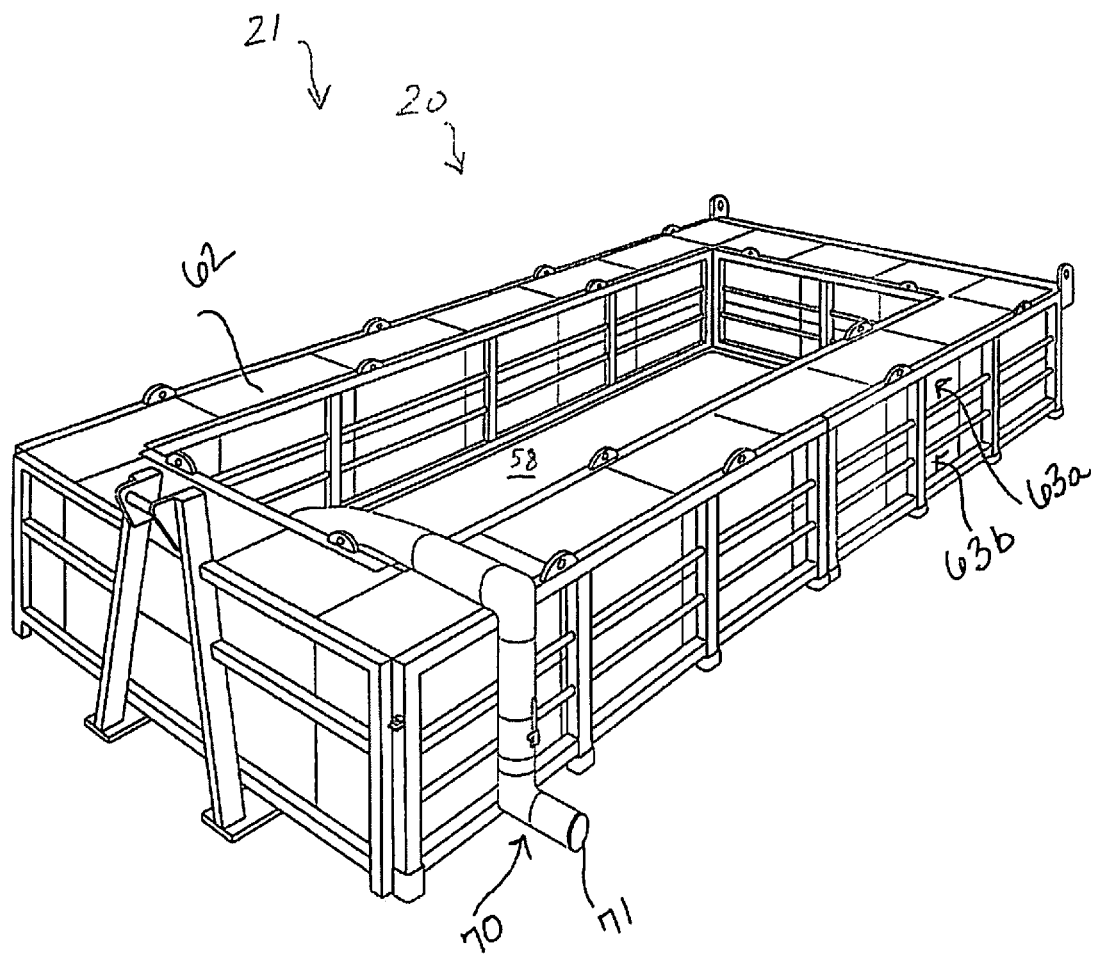
FIG. 8 is a perspective view of the system shown in FIG. 7.

As shown in FIG. 8, filter medium 60 comprises straw bales 62 positioned with a top layer of bales 63a located above and placed upon a bottom row of bales 63b. In one aspect a series of seven bales are placed end-to-end in the channel 50 along the vertical spans or columns of the margin 52 and along a perimeter of base 22, and two bales placed end-to-end in the channel 50 along the horizontal spans or rows of the margin 52 as shown. The two bales placed end-to-end in one aspect are flanked or covered by the bales positioned within the column aspect of the channel 50. Particularly, the bales 62 of straw are positioned and sometimes wedged between fence 30 and fence 40. The dimensions of a bale 62 in this example (i.e., "Example Bale") measure 34 inches (length) by 16 inches (width) by 14 inches (height). The bale 62 is placed on edge within channel 50 (with the 14 inch "height" dimension actually placed on edge (i.e., resting on the base 22) with the 16 inch "width" now spanning upward). Thus, a double stack or row of bales 63a, 63b will have a height measure of about 32 inches so that a portion of the bales extend upward past a top portion of segments 30, 40. The width of the channel 50 may be altered to accommodate for different dimensions of bales. Bales having different dimensions may also be used in the existing channel 50. In the present example, the width W (FIG. 4) of the channel is approximately 15.5 inches (measured on center from tube-to-tube (or from rail 49 to rail 39)). In one aspect the space clearance of width W is about 14 inches, which accommodates receipt of the bale 62 in a sideways or tipped-on-edge orientation. A typical bale 62 will include sections or flakes which may be severed or cut away from the balance of a bale 62. For instance, a bale may contain 3 to 4 flakes tied together. A user may sever one of the flakes away from the bale to shorten the length of the bale from 36 inches to 28 inches or other length corresponding to the removed flake. In this way a user may efficiently adjust the sizes of the bales 62 to fill the channel 50.

Figure 9:
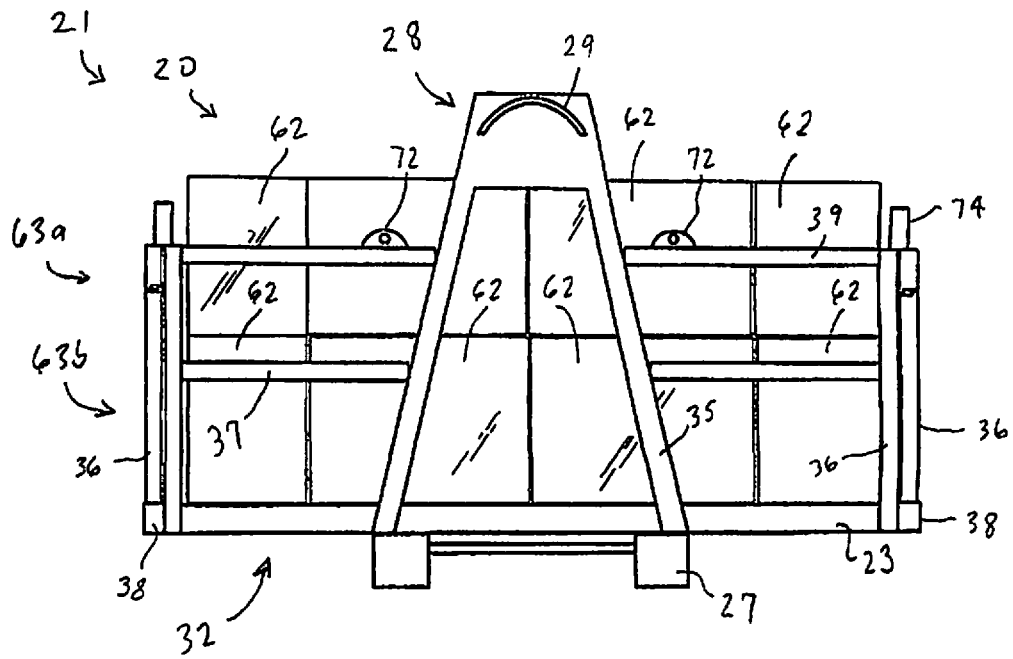
FIG. 9 is a front view of the system shown in FIG. 7.
Figure 10:
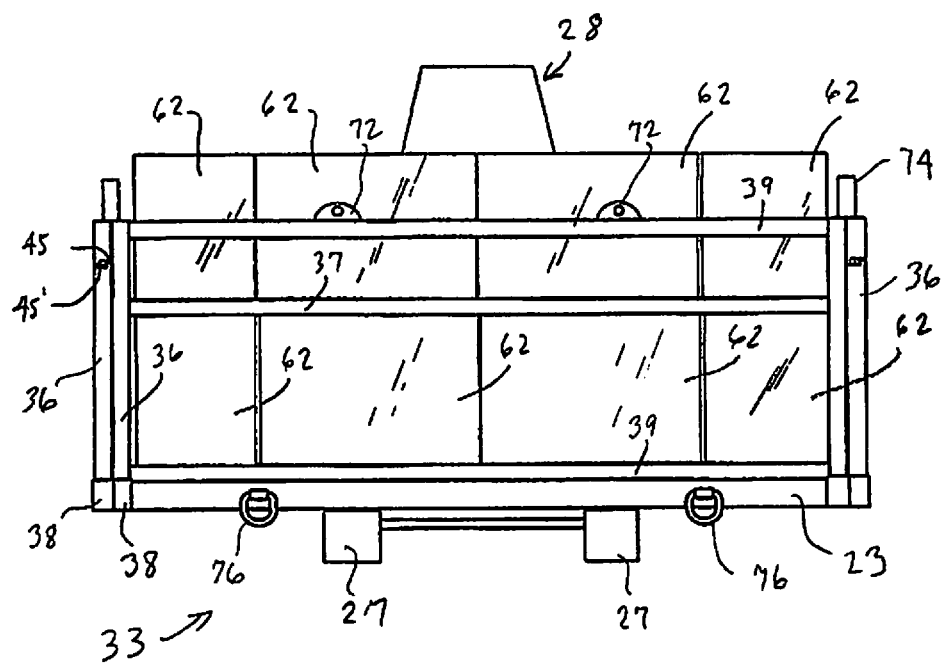
FIG. 10 is a rear view of the system shown in FIG. 7.

FIG. 9 shows a front view of sled 20 and system 21 containing representative bales such as Example Bales 62 made of straw. In this aspect the bales are shown to be positioned such that they extend above top rails 39 of sled 20. Such is the case where an Example Bale is used having a width dimension of 16 inches (standing on edge to create a double row height of approximately 32 inches above the base 22). FIG. 9 shows tongue 28 having arm bar 29 which is often curved or angled to assist receipt of a hydraulic lift arm. Base 22 in this example includes base rail 23 to which base segments 24 are connected. A rung 37 is positioned horizontally to connect angled struts 35 to posts 36. Lift eyes 72 are mounted to top rail 39. Posts 36 of front segment 32 are welded to base 22. Shown in this view are bales 62 forming top row 63a and bottom row 63b. In this example there are 8 bales shown. The four middle bales are inserted into the front row aspect channel 50 with the four outer bales inserted into the left and right column aspects of the channel 50. FIG. 10 shows a rear view of sled 20 and system 21. The rear or back segment 33 in this example is removable. The posts 36 insert into respective sockets 38. The top rail 39 is welded to posts 36; the middle rung or rungs 37 are also welded to posts 36. The lift eyes 72 can be used to easily lift back segment 33 out from sockets 38 and to also assist inlifting sled 20 when posts 36 are secured with pins within sockets 38. An additional or multiple posts 36 and respective sockets 38 may also be included as part of rear segment 33. Multiple rungs 37 may be used to provide further support of media placed in channel 50 about margin 52. Ears 45 are connected to the posts 36 of back segment 33 and to the posts 36 of segments 34 for convenient fastening of the respective segments. Top and bottom ears 45 may be used for enhanced connection. Quick release pins insert through respective ears 45, 45' for quick set-up and dismantling of respective segments 32, 33 and 34.

In assembly, the segments 34 of fence 30 are first installed, then the bales 62 positioned in the margin 52, and then the segments 44 of interior fence 40 assembled together and placed into position (and/or placed and assembled). Alternatively, the fence 40 is inserted and positioned within major internal area 31 prior to insertion of the bales 62. Fence 40 may be pushed against a vertical line of bales 62 to assure sufficient width W for the opposite channel 50 so that the opposite side of channel 50 may also receive a line of straw bales 62. In alternatives, fence 30 and fence 40 are positioned generally as shown, and bales 62 are dropped or set into the channel 50 along and throughout the margin 52. In a further aspect two bales 62 are positioned end-to-end within the channel 50 at opposite ends as shown, with two bales 62 positioned between the exterior front segment 32 and interior front segment 42, and two bales positioned between the back segment 33 and interior back segment 43. A series of 7 bales 62 may also be positioned at the opposite side of margin 52, thereby having a set of bales 62 extending completely around the channel 50 and filter bag 58. In one aspect the bales 62 are firmly pressed against each other within channel 50. As presented above, multiple rows, including a double row of bales 63a, 63b may be utilized within channel 50. Additional rows 63 may be included as needed. In the example shown in FIG. 7 and FIG. 8, a total of 18 "Example Bales" 62 comprise the first (top) row 63a and a total of 18 Example Bales comprise the second (bottom) row 63b, totaling 36 bales. Fewer or greater numbers of bales may be used. In one aspect bag 58 has dimension of approximately 54 inches wide by 15 feet long, and fits within minor internal area 41 without contacting fence 40. In other aspects where a wider sled 20 is used as noted below, bag 58 has a width of approximately 7 feet and length of 15 feet. Different size dimensions may be used.

In alternatives, sled 20 is widened such that a row of 3 bales 62 (even Example Bales, if desired) are positioned end-to-end opposite end rows of channel 50 with 7 bales aligned end-to-end along columns of channel 50. Such wider 3 bale structure allows for use of a larger filter bag 58 and larger filter medium 60 within the larger channel 50. In alternatives, 8 or more bales 62 (or 6 or fewer bales 62) may be placed end-to-end within channel 50 to accommodate different sizes of filter bags 58 and medium 60, and also to accommodate use of different sizes of sleds 20. A typical 7×2 bale configuration (i.e., accommodating an Example Bale 34×16×14 inch bales 62) allows for use of a sled 20 having an approved (even pre-approved) highway transportation width without having to obtain special transport permitting. In one aspect the sled 20 will have a total width of about 102 inches and a total length of about 263 inches.

When the filter bag 58 has been placed within fence 40 and connected to supply piping 70, and when filter medium 60, such as bales 62, has been installed within channel 50, operation of system 21 begins. Particularly, water to be dewatered is supplied to bag 58 via piping 70. Water inserted into bag 58 seeps through the filter medium of the filter bag 58 as filtrate. In alternatives the water may be forced through the filter medium. Left behind within the bag 58 is the "filtride". Filtride contains matter such as mud or sediment or fines or other material to be removed from the water. The water which seeps or exits from bag 58, i.e., the filtrate, passes through fence 40 and into filter medium 60 for a secondary containment or secondary filtration step. The filtrate passes through medium 60 and outward from fence 30. The secondary containment layer or filter (i.e., the filter medium 60) may also filter materials from the water. Over time the filter medium 60 will accumulate matter (filtrides) which eventually slow down the flow of water to the environment. At some point the filter medium 60 will need to be replaced with fresh medium (such as new straw bales) if and when the medium 60 clogs or deteriorates.

In alternatives, filter medium 60 includes filter socks or filter core logs 64, which include a filter material or membrane or a core of filter material. In one aspect a filter core log 64 has a diameter of 18 inches and 50 feet in length. A core log 64 or multiple core logs 64 are positioned within channel 50 and wrapped around the margin 52 to encircle filter bag 58. The core logs 64 may include special filter materials or membranes to further filter the exiting water and provide secondary containment of the undesired particles, pollutants or contaminants. Over time the core logs 64 may also become over-used or clogged, and then replaced with fresh core logs 64. The core logs 64, straw bales 62 and filter bag 58 may all be removed and disposed of as needed and according to disposal regulations. The straw bales 62 and logs 64 may be reused depending upon the amount of sediment captured at or within the bales 62 or logs 64. In cases where the dewatered water is very clean (i.e., contain minimal sediments or contaminants), the bales 62 or logs 64 may be used for several days or weeks or longer. For instance, if the sediment load is low, the medium 60 may not need to be replaced and remains in position for repeated use over long periods of time. This is the case even though the bales 62 or logs 64 are wet. When bales 62 get wet or soggy, they typically can't be moved, or moving them would cause them to tear or fall apart. With the present system, however, the portable sled 20 allows the medium 60 to be transported without having to separately lift the bales or logs or have them fall apart. In prior systems where the bales are placed on the ground, the bales would not be reusable, generally because the bales get wet and fall apart and could not be transported to another location for effective secondary containment.

A filter bag 58 with the present system 21 is also reusable. The bag 58 may be used at multiple locations because the sled 20 may be moved without the tearing of bag 58. Bags 58 typically do not have an internal or self-supporting structure to support being transported when containing materials or filtrides. When material is located within the bag 58, especially when bag 58 is also wet, the bag typically cannot be easily moved without tearing and spilling of the contents within the bag 58. Yet having the bag 58 placed on the base 22 allows for easy transportation and re-use of the bag 58 without the bag 58 breaking or tearing.

Figure 11:
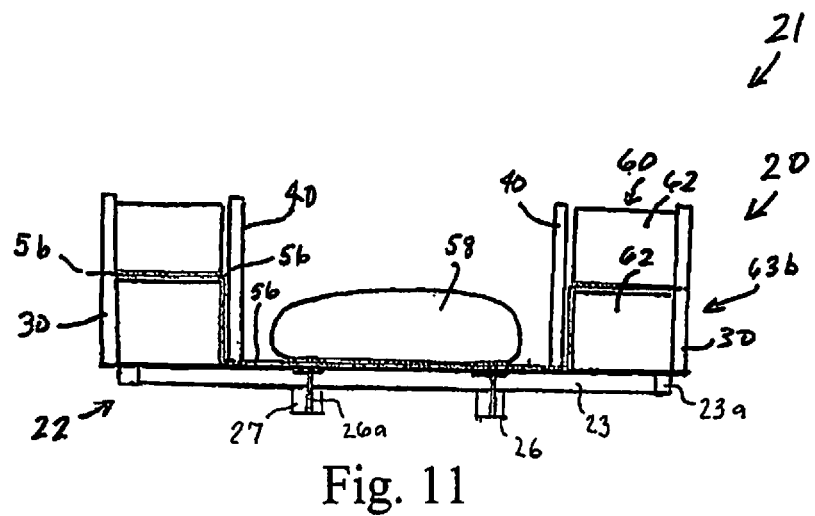
FIG. 11 is a cross-sectional view taken along line 11-11 of FIG. 7.

FIG. 11 is a cross-sectional view taken along line 11-11 of FIG. 7. Filter bag 58 is shown positioned upon base 22 within fence 40. Placed upon base 22 and positioned between base 22 and filter bag 58 is a liner sheet 56. In one aspect liner sheet 56 is a non-permeable sheet made of plastic or other material. In further aspects liner sheet 56 is permeable and/or made of a filter material to also provide a filtering of water that seeps from filter bag 58. In operation, water that exits from bag 58 will pool within fence 40 due to liner sheet 56, thereby causing the water to rise and travel to the level of sheet 56. The exiting water will pass through medium 60 (which may include straw bales 62 and/or filter logs or filter socks 64) and exit sled 20 at a top area of bottom row 63*b*. Depending on the volume of water and rate of displacement, the exiting water will fall or trickle from the area adjacent the liner sheet 56. Even where liner sheet 56 is permeable or semi-permeable, water exiting bag 58 will also tend to pool within fence 40 (depending on the rate of permeability of sheet 56). The liner sheet 56 at least temporarily contains the filtrate. As shown in FIG. 11, at least a portion of liner sheet 56 extends upward from the base 22. Liner sheet 56 may extend upward from the base 22 a distance greater (or less) than that shown in the figures. In alternatives, filter bag 58 has a height located above the liner sheet 56 at the junction of the top row and bottom row of bales 62 or logs 64. Sheet 56 is also positioned atop the bottom row 63*b* at the front segments 32, 42 and back segments 33, 43. In alternatives, no sheet 56 is utilized. In further alternatives as referenced below, a lift frame 80 is positioned beneath filter bag 58. The lifting of lift frame 80 allows for convenient removal of filter bag 58. Lift frame 58 may be a solid or sealed substrate, or in alternatives is a porous structure to allow water to pass therethrough while allowing lifting action of filter bag 58. In one aspect of operation, liquid is received within filter bag 58 which is positioned on or above base 22. The liquid passes through the filter bag 58 and is contained and/or pools, at least temporarily, on the liner sheet 56 positioned beneath the filter bag 58 and at least partially extending upward from the base 22. The filtrate passes by gravity through filter media 60 and to the environment. In one aspect the filtrate passes the interior fence and through the secondary containment channel having a filter medium and passes the exterior fence of the sled.

Figure 12:
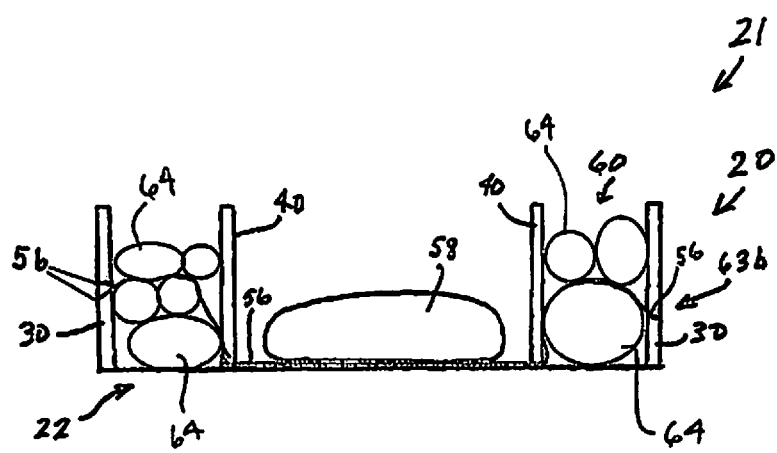
FIG. 12 is a partial cross-section view of a system using alternative filter media.
Figure 13:
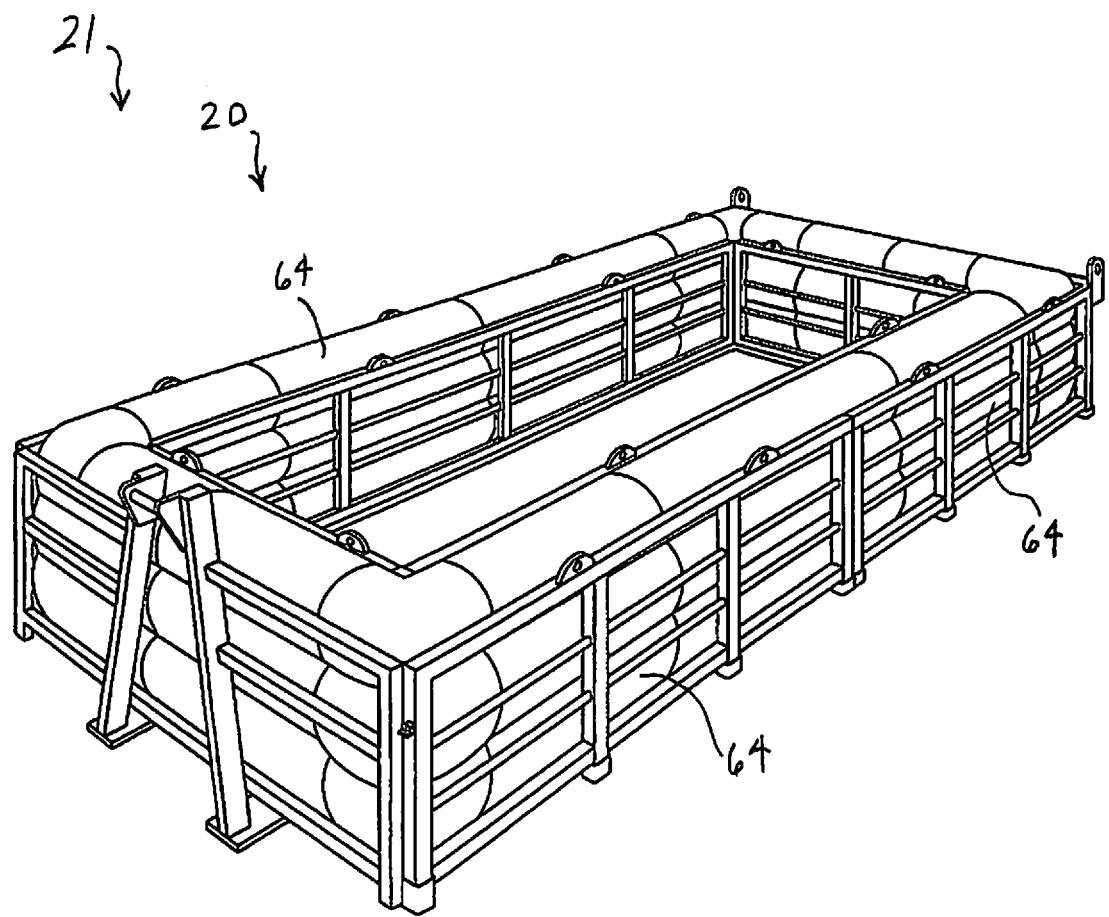
FIG. 13 is perspective view of the system shown in FIG. 7 having alternative media.

FIG. 12 is a partial cross-section view of a further aspect of the invention and showing use of filter core log 64 or several logs 64. A log 64 or filter sock or logs 64 containing filter core material a placed within channel 50 and wrap around the margin 52 and around bag 58. The logs 64 operate as secondary containment mechanisms. The logs 64 may be of the same or of different diameters and lengths. In one aspect a liner sheet 56 covers a bottom row of logs 64. The logs 64 will settle within the channel 50, conforming to the space. A variety of types of logs 64 may be used, having desired porosity and filtering characteristics. The logs 64 and bales 62 may be replaced when fresh medium 60 is needed or desired. The liner sheet 56 extends upward from the base 22, at least partially, and in one aspect runs upward and across at least one filter media 60.

In further reference to FIG. 3, fence 30 includes lift eyes 72 positioned at a top portion of top rails 39*b*. Lift eyes 72 include a through hole configured to receive a pin or cable or strap to secure to a boom, hoist, crane or lift arm in order to pick-up fence 30, segments 34, apparatus 20 and/or system 21. The lift eyes 72 are positioned at various locations about the perimeter of fence 30. Cables or straps or pins insert into lift eyes 72 for convenient lifting and placement of sled 20. Fence 30 also includes lift arm 74 positioned at back segment 33. Lift arms 74 also include through holes configure to receive pins, cables, straps or other devices to lift segment 33 and sled 20. A series of lift rings 76 are connected to base 22 for lifting and/or sliding sled 20. Cables and/or straps or other mechanisms may insert into rings 76 (which hinge or rotate in some instances) for convenient lifting and placement of apparatus 20. The tongue 28 may also be used, alone or together with lift eyes, arms and rings, to transport sled 20, such as via lifting and/or rolling on or off a truck or lifting via hydraulic boom or crane. The forgoing lifting elements accommodate lifting and transport of sled 20 and system 21 when filter bag 58 is filled with material.

Figure 15:
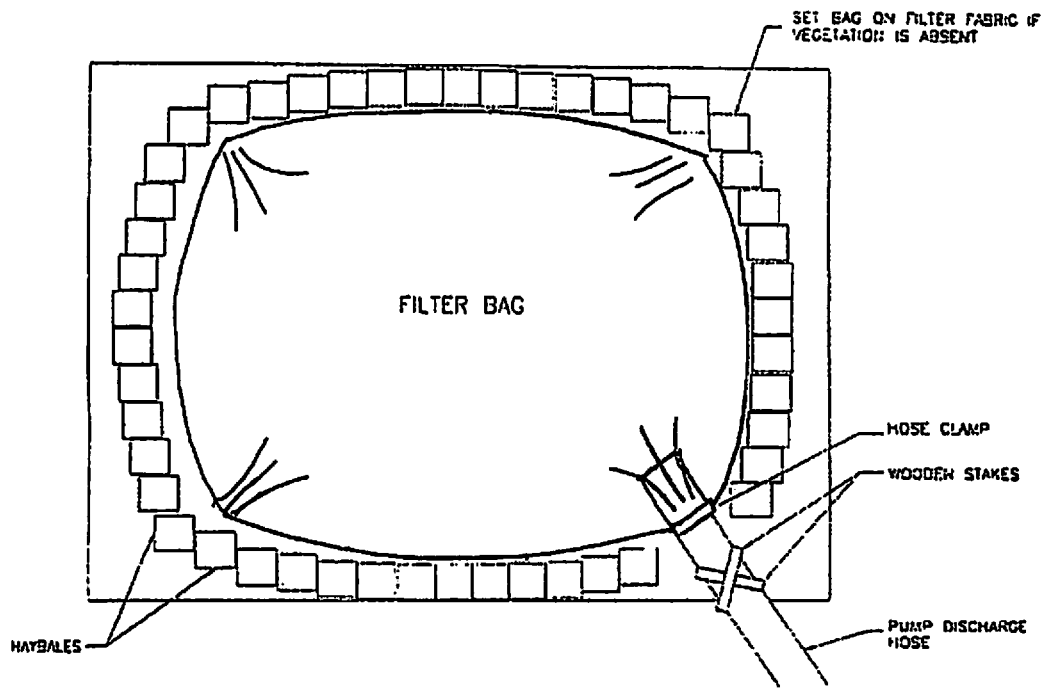
FIG. 15 is a top view of a prior art system for dewatering containing a filter bag surrounded by hay bales.
Figure 16:
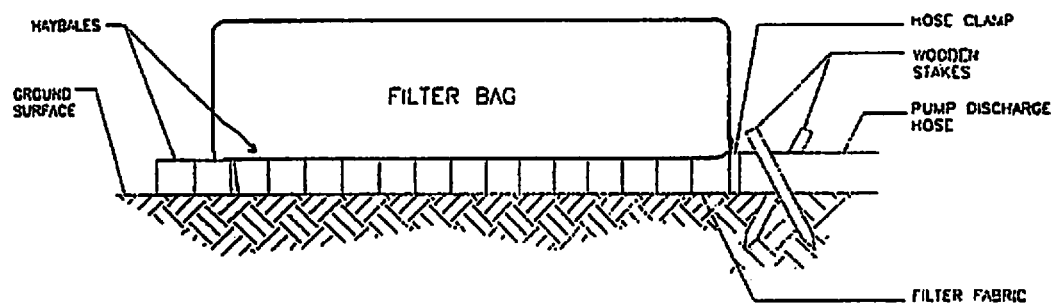
FIG. 16 is a section view of the system of FIG. 15.

In some operations, a system 21 will be positioned in a right-of-way of a construction site or other area. The filter bag 58 will receive a supply of water and capture particles, sand and/or unwanted matter or contaminants. The water will spill, generally or entirely by gravity, from apparatus 20 and travel to a desired retaining area, stream or other designated and appropriate location. In some instances, where the amount of water to be dewatered is relatively minor, the apparatus 20 and system 21 is reused. For instance, if a hole has been filled over night with rain water, pumping for 10 or 15 minutes may be sufficient to dewater the hole. Pumping the water via piping 70 to system 21 may be accomplished by setting apparatus 20 and system 21 into a convenient location near the hole (and within or external a designated right-of-way) in order to dewater the hole. The dewatering occurs using the primary and secondary containment aspects of system 21. When the pumping (dewatering) is completed within 10 to 15 minutes, for instance (or other durations as appropriate), system 21 is moved to a different location for further use. The filter bag 58 and/or filter medium 60 are reused (as appropriate). If the bag 58 is filled or near-filled, or if the filter medium 60 becomes filled or ineffective, the bag 58 and medium 60 may be replaced. The bag 58 and filter medium 60 remain in place during transport. Such portability and re-use greatly improves efficiency and lowers costs otherwise associated with having to create one-time use secondary containment solutions. For instance, as depicted in FIG. 15 and FIG. 16, one-time use solutions typically involve building a secondary containment layer of hay bales or other medium around a filter bag. Once the one-time use solution is completed, the filter bag is typically disposed of (not re-used, even if only slightly filled with filtrides) and the secondary containment layer (bales) either abandoned or dismantled (requiring reclamation of the containment area). The bales are typically too wet or soiled to be transported or reused. The bag is typically too flimsy to be moved for reuse. These one-time use efforts are time consuming and expensive.

With the present system 21, however, the apparatus is portable and conveniently configured to be picked and placed where needed. Multiple apparatuses 20 and systems 21 may also be used to quickly dewater a site so that construction may proceed efficiently. Moreover, management of dewatering operations is made more efficient using system 21 in terms of having to devote less planning and construction time to dewatering projects.

The present system 21 also extends the effective work day. Time devoted to preparing secondary containment for dewatering is now devoted to other construction tasks. Moreover, there is less concern during construction to assure proper landscaping to avoid pooling at the construction site. This is because the dewatering step is now more efficient. Rather than spending valuable time landscaping a site to avoid pooling of water (such as what might occur toward the end of a construction day), the construction may continue without the landscaping. This is because the pooled water can be efficiently removed the following day using the present system 21 for dewatering, if needed. If there is no overnight rain, for instance, there is no or little need to undertake the minor dewatering actions. Actions taken the prior day to prepare landscaping would be unnecessary. This allows the managers of the construction site increased flexibility on how to allocate labor and resources.

In alternatives, piping 70 includes quick connect components at a terminal end 71 of piping 70 to accommodate quick removal and quick connection of water source conduit or pumps. The terminal end 71 may also be configured with alternative size components to receive different size diameters of source conduit or pumps. Thus, when sled 20 is to be transported to a new location, the piping 70 is conveniently disconnected from the supply conduit or pumps which draw the water to be dewatered from the site. This allows filter bag 58 to remain within apparatus 20. Moreover, the external end of piping 70 is the position which quick-connects with the source piping. This preserves the portion of piping 70 which inserts into the bag 58 to minimize disrupting the seal between the piping 70 and bag 58. Typically a clamp or collar is applied to the piping 70 to secure the piping within the bag 58. It is best to avoid over-handling of the bag and piping to assure a continued seal.

In further aspects, jacks with alternative winches and ratchet mechanisms are provided at corners of the base 22 (or at other locations in order to level sled 20). A user may raise and lower various portions of the sled 22 to establish a generally flat orientation for the base 22 upon which filter bag 58 is positioned. Sled 20 may also include a removable axle so that wheels are added for ease of transport. Various mounts and hitch balls and pins are combined with tongue 28 or adjacent tongue 28 so that sled may be hitched to a truck (even a pickup truck) for transport. In this manner the sled 20 may be efficiently moved about different areas of a construction site for targeted dewatering.

Figure 14:
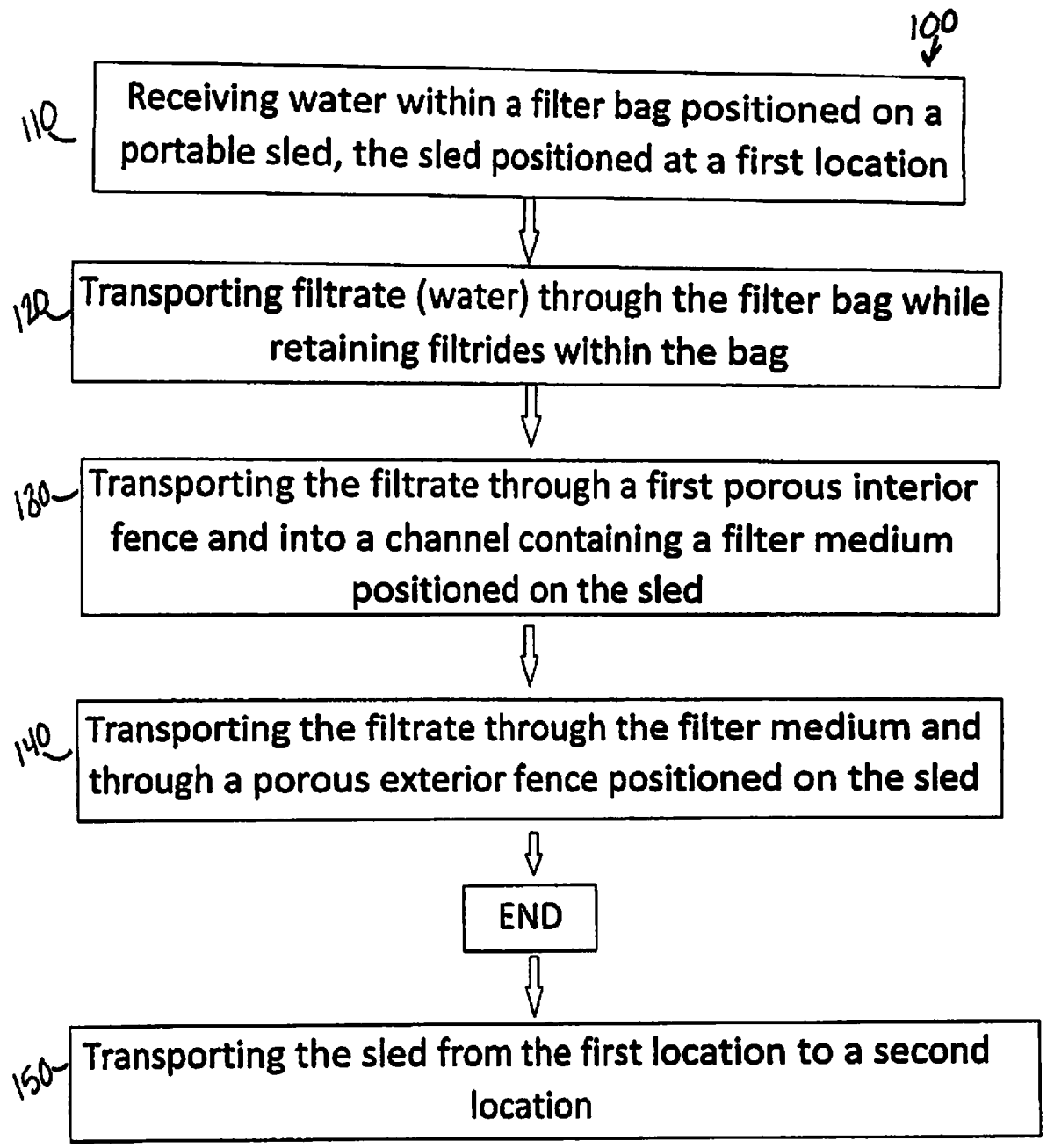
FIG. 14 is a flow diagram in accordance with a method aspect of the invention.

In a further aspect, the invention includes a method 100 of treating liquids while dewatering a site. FIG. 14 is a flow diagram in accordance with one aspect of the method. The method 100 includes a step 110 of receiving liquids such as water at a filter bag 58 positioned on a portable sled 20 at a first location. The receiving water step may be accomplished after pumping the water from the site to be dewatered using a pump and piping. The piping inserts into the filter bag 58 and is clamped into position. At step 120 the water (filtrate) is allowed to pass the filter bag 58 while filtrides are retained within the bag 58. The passing of the water is accomplished by use of gravity (naturally causing the water to pass through filter material comprising bag 58 and/or passing by use of pump pressure). For instance, a pump will force water into the bag 58 such that the force causes the water to seep through the bag 58 while contaminants or other material is retained in the bag 58 as filtrides. After the water exits the bag 58, the water may pool in an area around the bag 58 or travel by gravity action or by pressure causing the water to pass through a first porous interior fence 40. At step 130 the filtrate passes through the first porous interior fence 40 (for example by gravity) and into a channel 50 containing a filter medium 60. At step 140 the filtrate exits the filter medium 60 through a porous exterior fence 30 positioned on the portable sled 20. For example the filtrate exits by gravity. The water exits the sled 20 at multiple locations or areas around the perimeter of the sled 20. In one aspect the water spills over a first row of bales 63a. In an alternative aspect at step 150 the sled is transported from the first location to a second location. In one aspect such transportation is accomplished by retaining the filter bag 58 within the sled and re-using the filter bag 58 at the second location. The filter medium 60 is also retained within the channel 50 of sled 20 for reuse.

In further aspects the method includes replacing a filled or partially filled filter bag 58 (i.e., filled with filtrides). In some instances, where there are few or no contaminants in the water, the filter bag 58 need not be replaced frequently (it may be used until becoming full). An operator will observe whether the bag 58 is full or nearly full by observing the rate of flow of water being introduced into the bag 58. For instance, if the bag 58 is full or nearly full with filtrides, a supply pump will run under a greater pressure (due to the filled or relatively filed bag 58). A visual inspection of bag 58 may also indicate that it is full or nearly full, and a touching or pressing upon bag 58 by an operator may also demonstrate the bag is full or nearly full and needs to be removed and replaced. The filter bag 50 may fill swiftly depending on the amount of silt, particles, contaminant or other matter in the water and/or based on the material characteristics of the bag. Some filter bags will have less porosity and capture more filtrides compared to other types of varieties of filter bags.

The transporting step 150 may include placing the sled 20 upon a transport truck and subsequently placing the sled 20 at a second or subsequent location. The sled may be lifted via a hydraulic arm connecting with the tongue 28, or lifted by use of a hoist or crane. Sled 20 may also be transported by picking up sled at lift eyes 72 and/or lift arms 74 and/or lift rings 76. The sled 20 may also be transported by dragging. In other aspects the sled may be transported by use of an axle (fixed or removable) with wheels, and towed to a new location. A pickup truck may also be used to hitch to the sled 20 and transport the sled to different locations. In some aspects a fully loaded sled 20 will weigh several thousand pounds. In one aspect sled itself, unloaded, will weigh 7,000 pounds. When loaded with filter media (assuming approximately 40 pounds per bale), at 36 bales (18 per layer), the total weight is approximately 8,440 pounds (without considering the weight of filter bag 58 or the additional material captured within the bales). In some cases a crane or side boom or heavy machinery having cables and pulleys on a winch system or utilizing a hydraulic piston, or machinery including fork lifts or other lifting apparatus, are used to lift and transport sled 20 and system 21.

In further aspects, the base 22 of sled 20 is porous such that liquids and water may pass therethrough. In one aspect a liner sheet 56 is positioned over the porous base 22 so that liquids or water may not pass therethrough, functionally sealing the base 22. Thus, the base 22 may be used both to allow liquids to pass, or with the use of a liner sheet 56, to contain (and/or pool) liquids at least temporarily. The pooling of filtrate allows a further opportunity for materials (fine particles, sediment or other debris) in the filtrate to settle or otherwise be removed from the filtrate.

Figure 17:
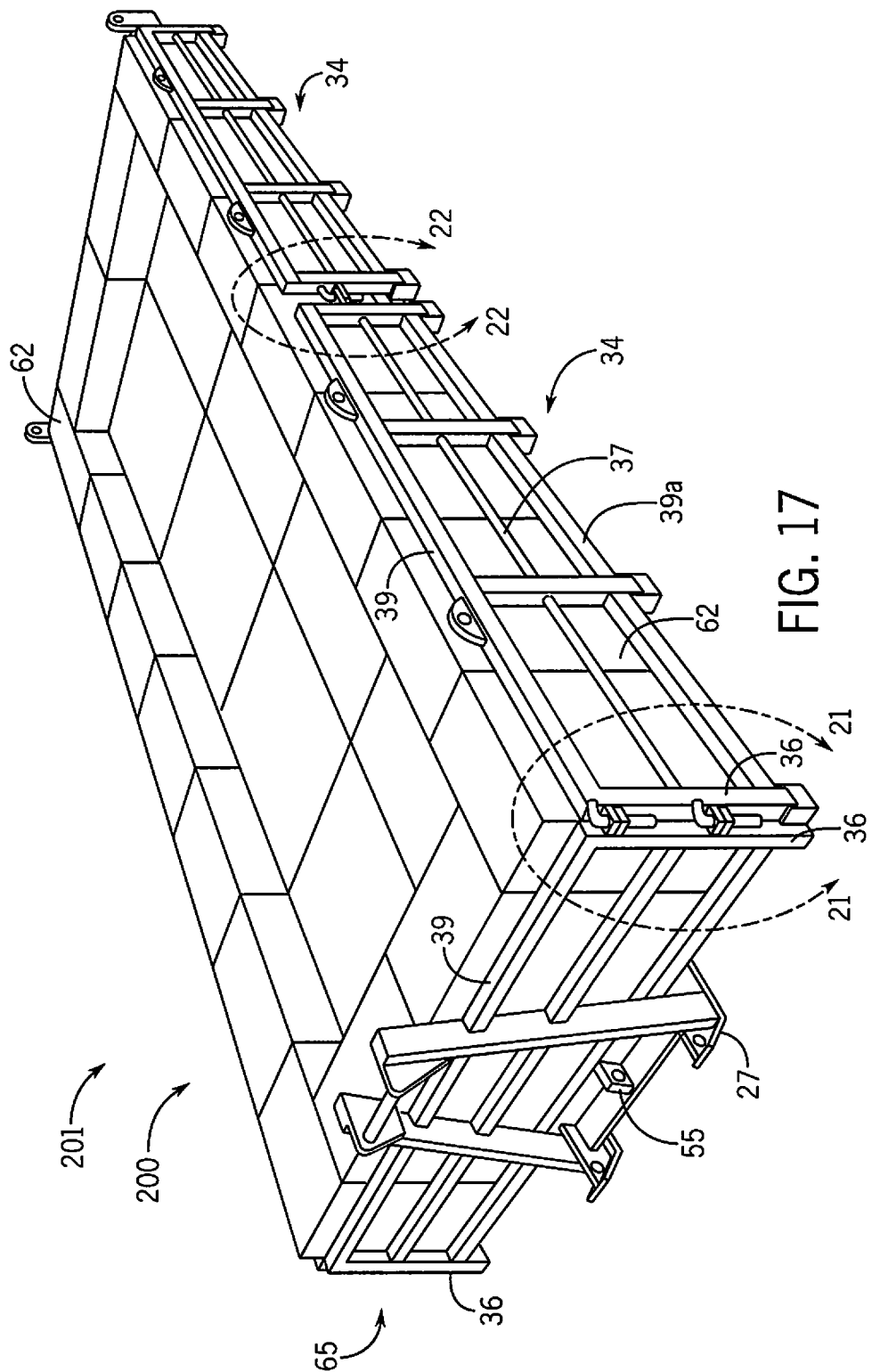
FIG. 17 is a perspective view of an apparatus made in accordance with a further aspect of the present invention.

FIG. 17 is a perspective view in accordance with a further apparatus aspect of the invention. Sled 200 includes a porous base 22' configured to allow water and liquids to pass therethrough. In one aspect a plurality of segments 34 are positioned around a perimeter of the base 22'. Segments 34 are configured to retain straw bales 62 or filter core logs or socks 64 or other filter media within the perimeter of the base 22'. Segments 34 include posts 36 which in one aspect insert within sockets 38 connected to the sled 200. The posts 36 may be selectively removed from the sockets 38 to accommodate storage and loading of bales 62 onto the sled 200. In one aspect the sockets 38 are connected to the base 22'. In further aspects segments 34 are mounted to the sled by welding and are not removable or intended to be removed. The segments 34 have a top rail 39 which spans generally horizontally between spaced-apart posts 36. Optional or alternative rungs 37 may also be positioned between top rail 39 and base 22'. As shown in FIG. 17, a single rung 37 is positioned between top rail 39 and a bottom rail 39a. Additional rungs 37 may be used, and in alternatives, no rung 37 may be used. Top rail 39, rungs 37 and posts 36 are designed to retain bales 62 or other media 60 within a perimeter of the base 22'. The height of the segments 34, the spacing of posts 36, and the use of or amount of rungs may be modified to accommodate different sizes of bales and different dewatering applications.

Sled 200 is configured to receive multiple bales 62 or other media, and in one aspect the multiple bales 62 are placed to form a single layer 65 of bales 62. In one aspect single layer 65 covers an entirety of the base 22'. In other aspects a single layer 65 may cover less than an entirety of the base. Recall in aspects associated with FIGS. 5, 8-11, multiple (i.e., two or more) layers 65 of bales 62 (or other media) may also be used. Multiple layers 65 may also be used in conjunction with sled 200. FIG. 17 shows one type of a bale arrangement for use in the invention. Other bale arrangements may be used depending on the case and the dimensions of sled 200, and depending on the dimensions of the bales 62 or other filter media 60. The particular number of bales 62 shown in FIG. 17 is for illustration purposes only.

Figure 26:
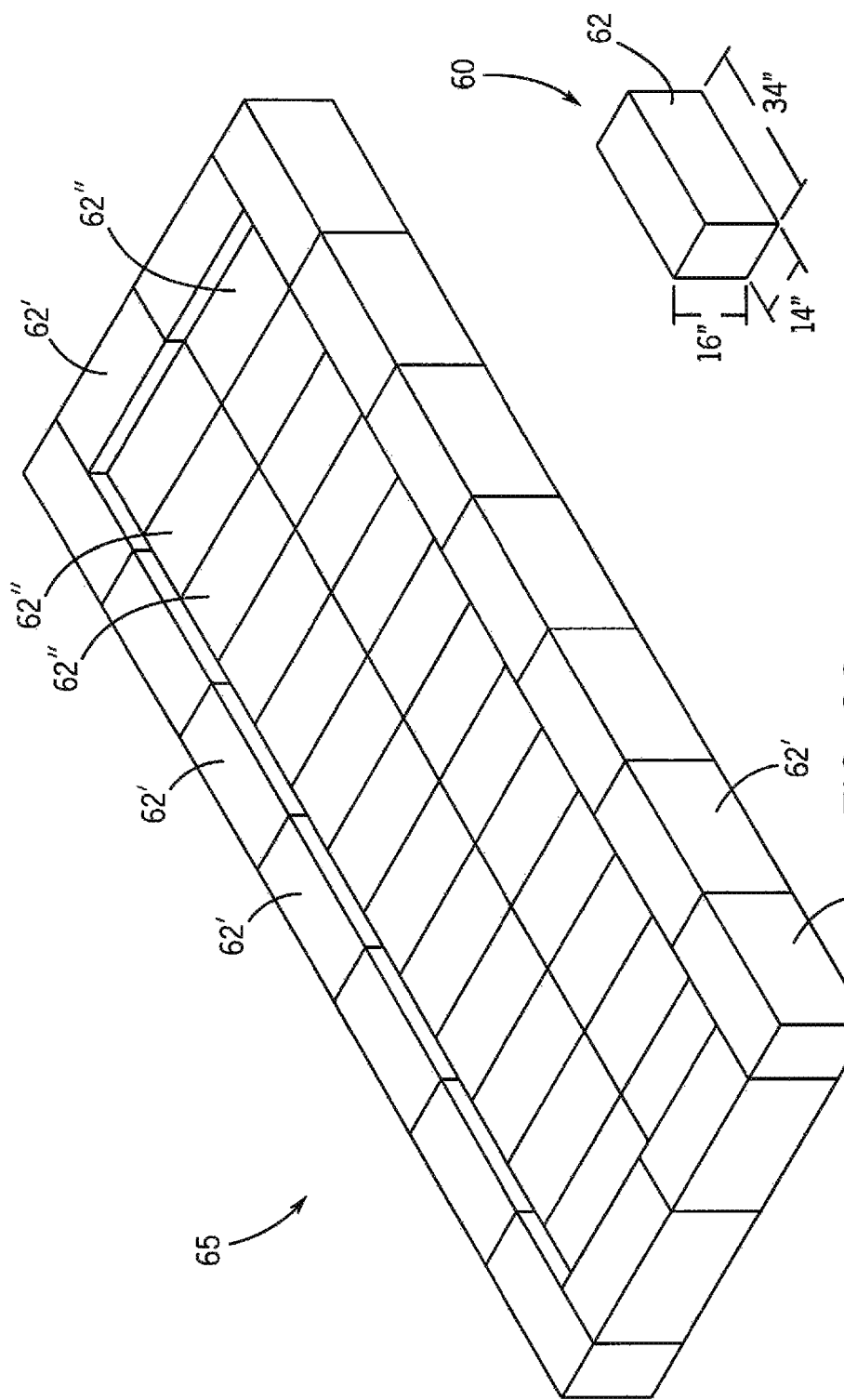
FIG. 26 is a perspective view in accordance with further aspects of the invention.

FIG. 26 and FIG. 26A are perspective views depicting representative filter media 60 of bales 62 and a single layer of bales 65 for use in one aspect of the invention. In one aspect, perimeter bales 62' are placed on edge (not on end and not on side) upon base 22' while inner bales 62" are placed on side (and not on end and not on edge). For instance, with respect to an Example Bale having dimensions 14 inches high by 16 inches wide by 34 inches long, the perimeter bales 62' are placed on edge so that an area of 14 inches by 34 inches of the bale is placed on the base 22' (the bale extending upward 16 inches), while inner bales 62" are placed on side having a having an area of measure of 16 inches by 34 inches of the bale placed on the base 22' (the bale extending upward 14 inches) The inner bales 62" when placed on side have an upper surface 66 positioned approximately a first distance D1 (See FIG. 19) (in one aspect 14 inches) from the base 22' while the perimeter bales 62' when placed on edge have an upper surface 66' positioned a second distance D2 (in one aspect 16 inches) from the base 22' (See also FIG. 19). In one aspect, the second distance D2 is greater than the first distance D1. The distances D1 and D2 may vary depending on the nature or type of bales 62 or other media being used. In one aspect the difference between the upper surface 66' and upper surface 66 creates a lip having a measure of 2 inches. In other examples the lip may be greater than or less than or 2 inches. In further examples there is no lip and the upper surfaces of the bales are at the same or generally the same height.

Figure 18:
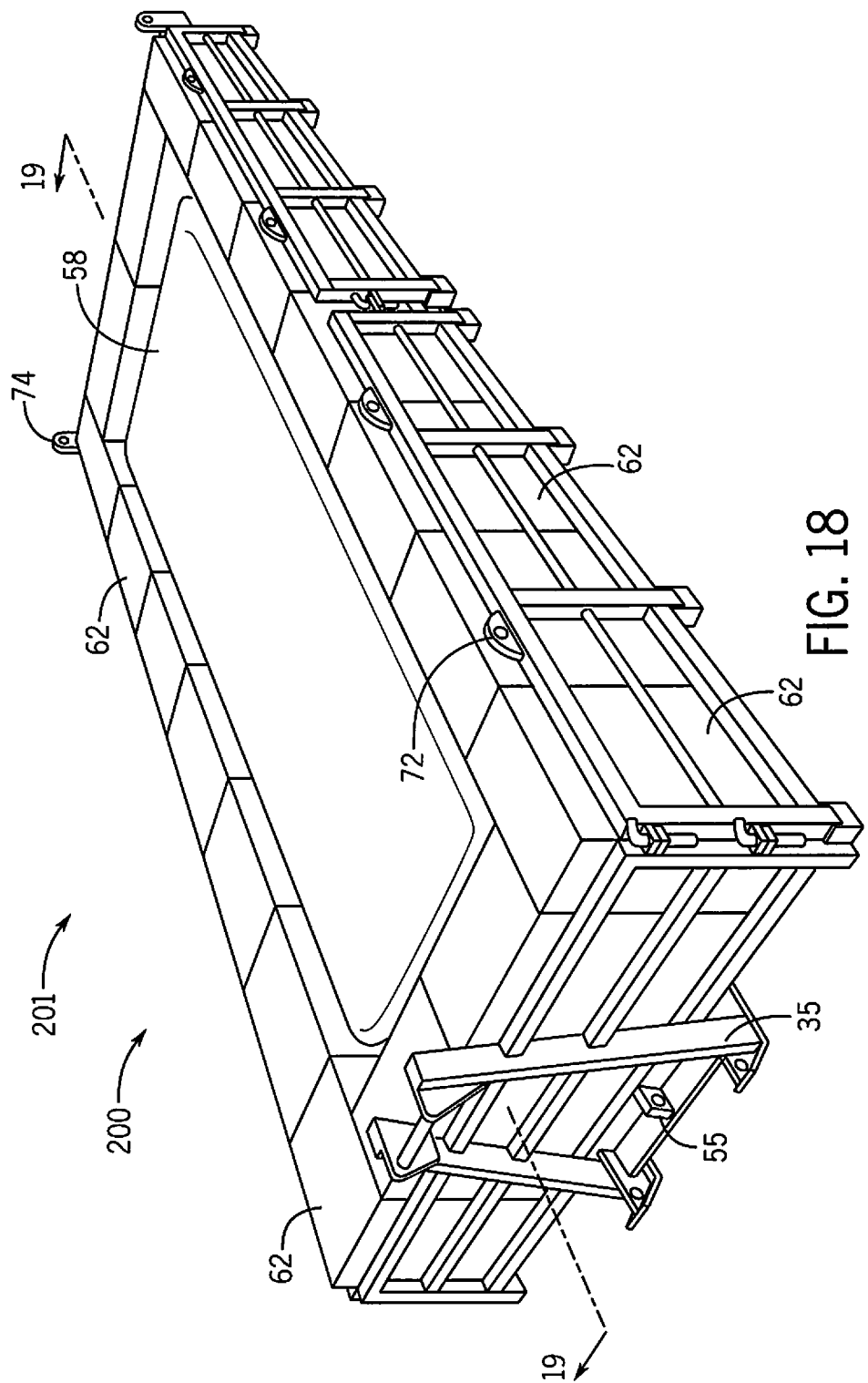
FIG. 18 is a perspective view of the apparatus of FIG. 17 and of a system aspect in accordance with the present invention.

As shown in FIG. 18, a filter bag 58 is positioned at an interior portion of the sled 200. In one aspect bag 58 is positioned upon inner bales 62". In one aspect, a bottom layer of the filter bag 58 is positioned below the upper surface 66 of perimeter bales 66'. In this manner at least a portion of the perimeter of bag 58 is bounded by a wall or lip (or at least a partial wall) of straw bales 62'. In further aspects, a top layer of the filter bag 58, when bag 58 is in an unfilled state, will also be positioned below the upper surface 66' of perimeter bales 62', and in further aspects the top layer of filter bag 58 is also positioned below the upper surface 66' of perimeter bales 66' even when filter bag 58 is filled with sediment or filtrides.

Figure 19:
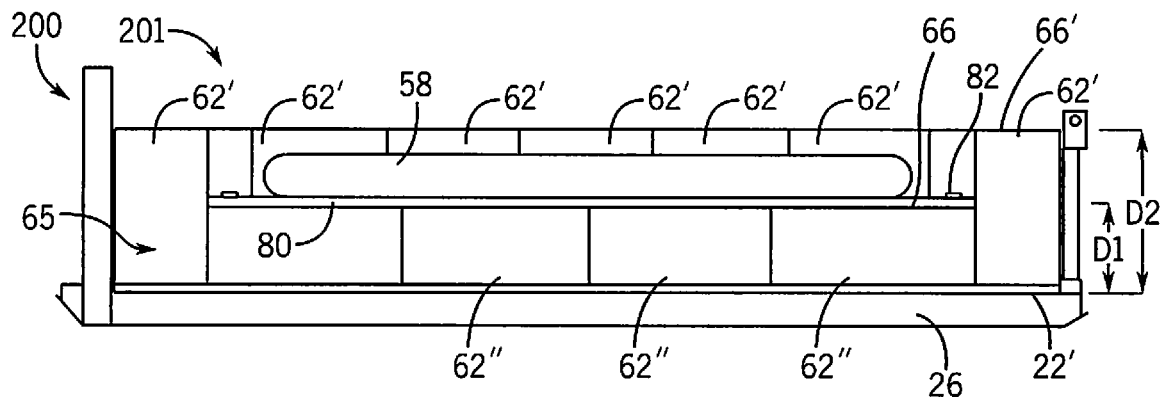
FIG. 19 is a section view taken along line 19-19 of FIG. 18.

FIG. 19 is a section view taken along line 19-19 of FIG. 18 showing filter bag 58 positioned above inner bales 62". In one aspect bag 58 rests on at least one inner bale 62". In other aspects, filter bag 58 rests upon a lift frame 80 as described further below. A conduit or piping 70 inserts into filter bag 58 to supply liquids to the bag 58 to be treated. In operation, liquid is pumped to and received by filter bag 58 which is positioned above filter media 60 which is positioned above the porous base 22' of portable sled 200. Liquids which emerge through filter bag 58 as filtrate travel by gravity through filer media such as filter layer 65 (i.e., bales 62"). The filtrate proceeds through porous base 22' and drains to the ground. The filter bag 58 is inset within the sled and protected by having the taller perimeter bales 62". Bales 62' are also available as a treatment layer for liquids that spill to the sides or perimeter area, which pass through perimeter bales 62' and downward through base 22' or outward from the sled 200. A filter bag 58 being a first liquid treatment mechanism and filter medium 60 as a second liquid treatment mechanism contained within a sled 200 provide a portable system 201 for dewatering construction locations. When the filter bag 58 it full it is easily replaced by removal using lift frame 80, for instance, shown below.

In some aspects a liner sheet 56 may also be used in conjunction with filter layer 65, such as by positioning a liner sheet 56 at a top of inner bales 62' to create at least a partial pooling barrier. In further aspects a liner sheet 56 may cover at least a portion of inner bales 62' and extend downward such that at least a portion of perimeter bales are positioned on top of liner sheet 56. Liner sheets 56 may be used to create a variety of different barriers and pooling areas in conjunction with filter media 60.

In further aspects sled 200 includes segments 34 which are configured to surround filter media 60 such as with single layer 65 shown in FIG. 26. The segments 34 are configured with a height sufficient to retain bales 62'. The segments 34 may include a top rail 39 such that bales 62' extend upward from the top rail 39. In one instance, top rail 39 is positioned less than 16 inches above base 22' and segments 34 contain no rungs 37 between posts 36. The size and number of bales 62 positioned on sled 20, 200 is not limited to those shown in the figures.

Figure 20:
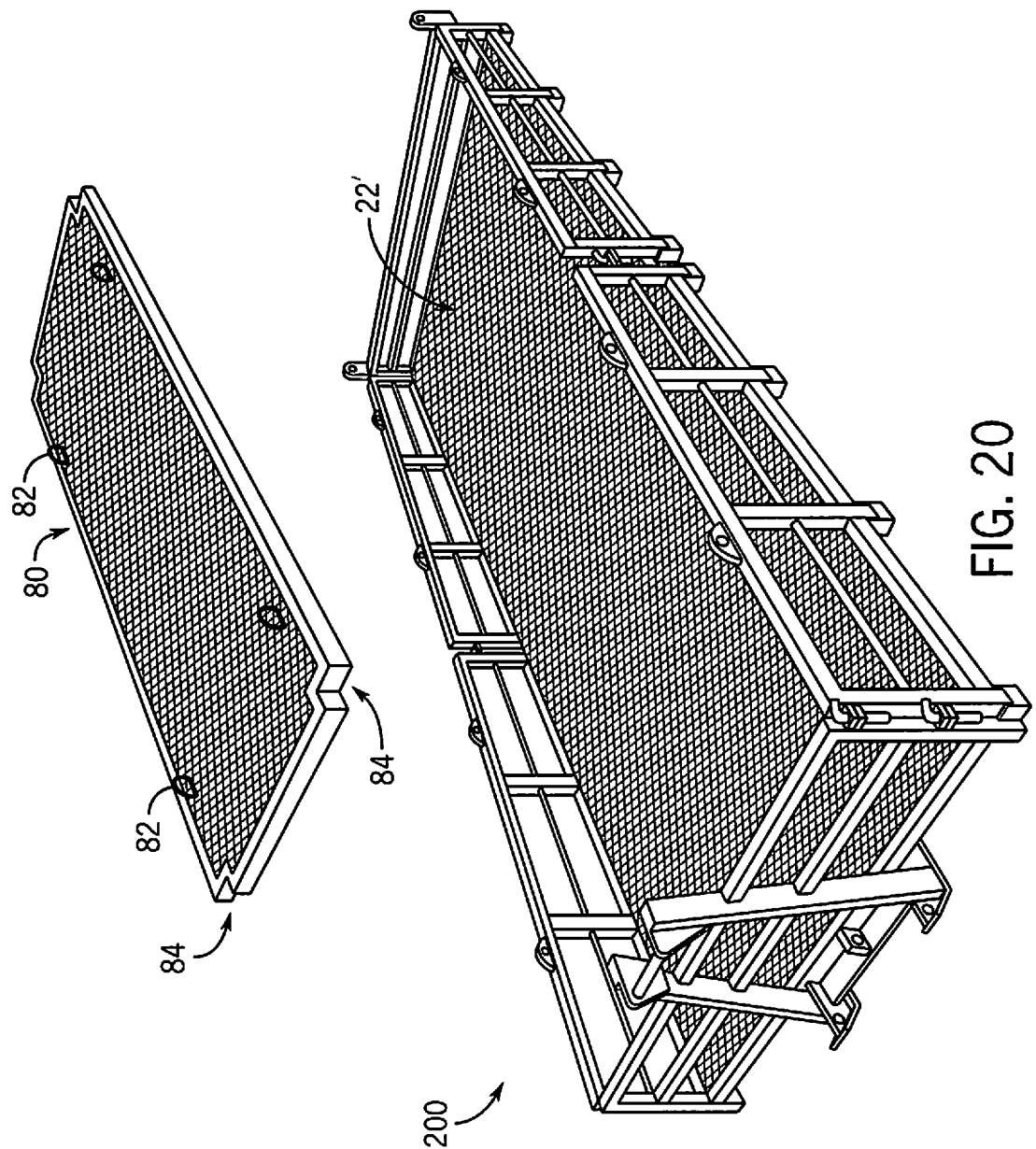
FIG. 20 is an exploded perspective view of an apparatus and system in accordance with further aspects of the present invention.

FIG. 20 is an exploded perspective view of further apparatus and system aspects of the present invention. Sled 200 includes a porous base 22' which in one aspect is made of expanded metal. Base 22' is sufficiently strong to hold filter media 60, filter bag 58 and lift frame 80. Cross members forming a lattice structure are provided under the expanded metal in one instance to provide support for porous base 22'. In one aspect, a filter bag 58 may be placed directly on base 22' and without an intermediate filter medium 60. In such arrangement filtrated exiting filter bag 58 travels through porous base 22' and onto the ground or surface below sled 200. Such arrangement is useful where only minimal liquid treatment is required or needed such as where only a single filter bag 58 is enough for the treatment or to comply with regulations.

In a further aspect, a filter bag 58 may be placed upon lift frame 80 which in turn is placed on base 22'. Lift frame 80 accommodates easy lifting of filter bag 58. Otherwise, it may be difficult to lift filter bag 58 when it contains sediment or filtrides. Where a filter bag 58 contains sediment or filtrides, especially when such materials are wet or damp, attempts to lift the filter bag 58 directly, such as by grasping the filter bag 58, may result in tearing or otherwise causing filter bag 58 to break open. A broken filter bag 58 may cause the filtride to spill, requiring further clean-up or fines/penalties for failure to undertake cleanup. In one aspect lift frame 80 includes lift hooks 82 such as D-hooks configured to receive a hook or chain. A lift hook 82 is positioned at each corner area of lift frame 80. In one aspect a crane or boom or equipment using a hydraulic piston or pulleys and winch or other equipment is used to lift the lift frame 80. In one aspect four chains or straps are connected to respective four lift hooks which align to a single lift point or otherwise connect to a crane or lift truck or other machine capable of lifting the lift frame 80 while a full filter bag 58 rests on the frame 80. In one aspect lift frame 80 is to be lifted upwards vertically, and preferably straight upward with lift frame 80 remaining level so that filter bag 58 does not slide or spill, and also so that lift frame 80 does not contact segments 34.

In other aspects lift frame 80 is placed upon filter medium 60, 62 and then filter bag 58 is placed upon lift frame 80. In alternative aspects, filter medium 60, 62 is placed upon lift frame 80 and then filter bag is placed upon filter media 60, 62. In further aspects, lift frame 80 is positioned upon inner bales 62" and then filter bag 58 is placed on lift frame 80. Thus filter bag 58 may be removed from sled 200 without moving any media 60, 62. In further aspects, multiple frames 80 and/or multiple filter bags 58 may be used within a sled 20, 200.

In one aspect lift frame 80 is positioned within interior fence 40 of sled 20. In such case lift frame 80 may include notched corners 84 to provide sufficient clearance to pass upward from interior fence 40 without contacting ears 45 if ears 45 are positioned internally of interior fence segments 42. In one aspect lift frame 80 may cover substantially the entirety of base 22'. In other aspects, as shown in FIG. 20, lift frame 80 is configured to cover a central area of sled 200 upon which the filter bag 58 is placed. The frame 80 may be removed from sled 20 without having to remove bales 62 or filter media 60.

Figure 21:
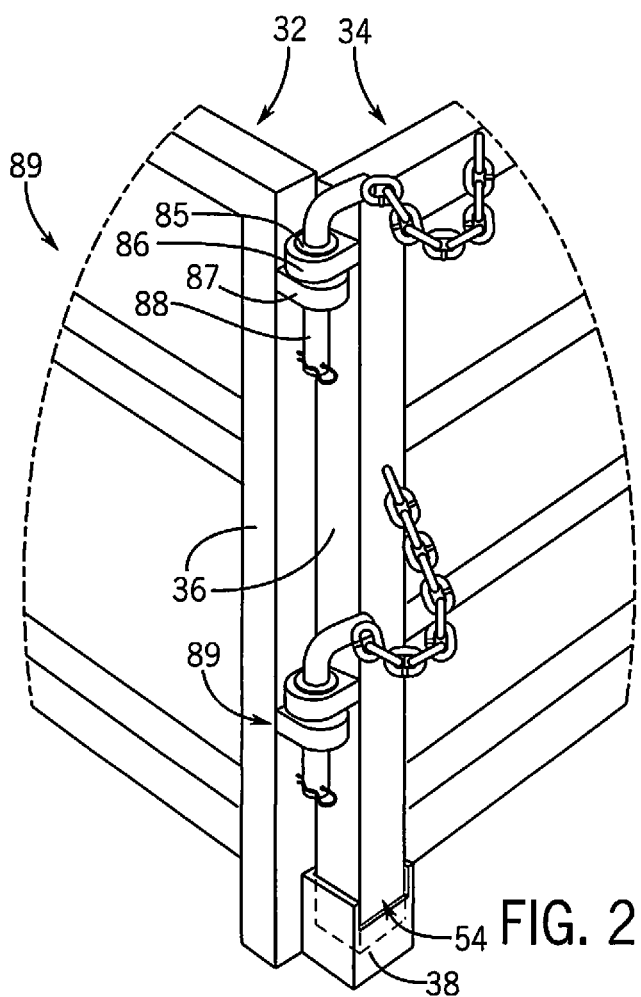
FIG. 21 is a partial close-up perspective view of FIG. 17 and of an alternative for the apparatus FIG. 1.

FIG. 21 is a partial perspective view of fence segment 34 connected to front segment 32. The fence segments 34 are of the variety used in sled 20 and/or sled 200. In this aspect a first post 36 of fence segment 34 is connected to a second post 36 of front segment 32. A first hinge component 86 connected to and extending from first post 36 has a through hole which aligns with a through hole of a second hinge component 87 connected to and extending from second post 36 of front segment 32, for instance. The hinge components 86, 87 may be fastened, such as by welding, to posts 36. A pivot pin 88 is positioned through the aligned through holes of components 86, 87 and is secured at a bottom portion with a pin such as a cotter pin. The hinge components 86, 87 together with pivot pin 88 operate as a hinge 89 which allows segment 34 to swing outward from sled 20, 200 by rotation about pivot pin 88. In one aspect a washer 85 is connected to pivot pin 88 which operates as a cap or cover so that pin 88 has a limited insert within the through hole of component 86.

Figure 27:
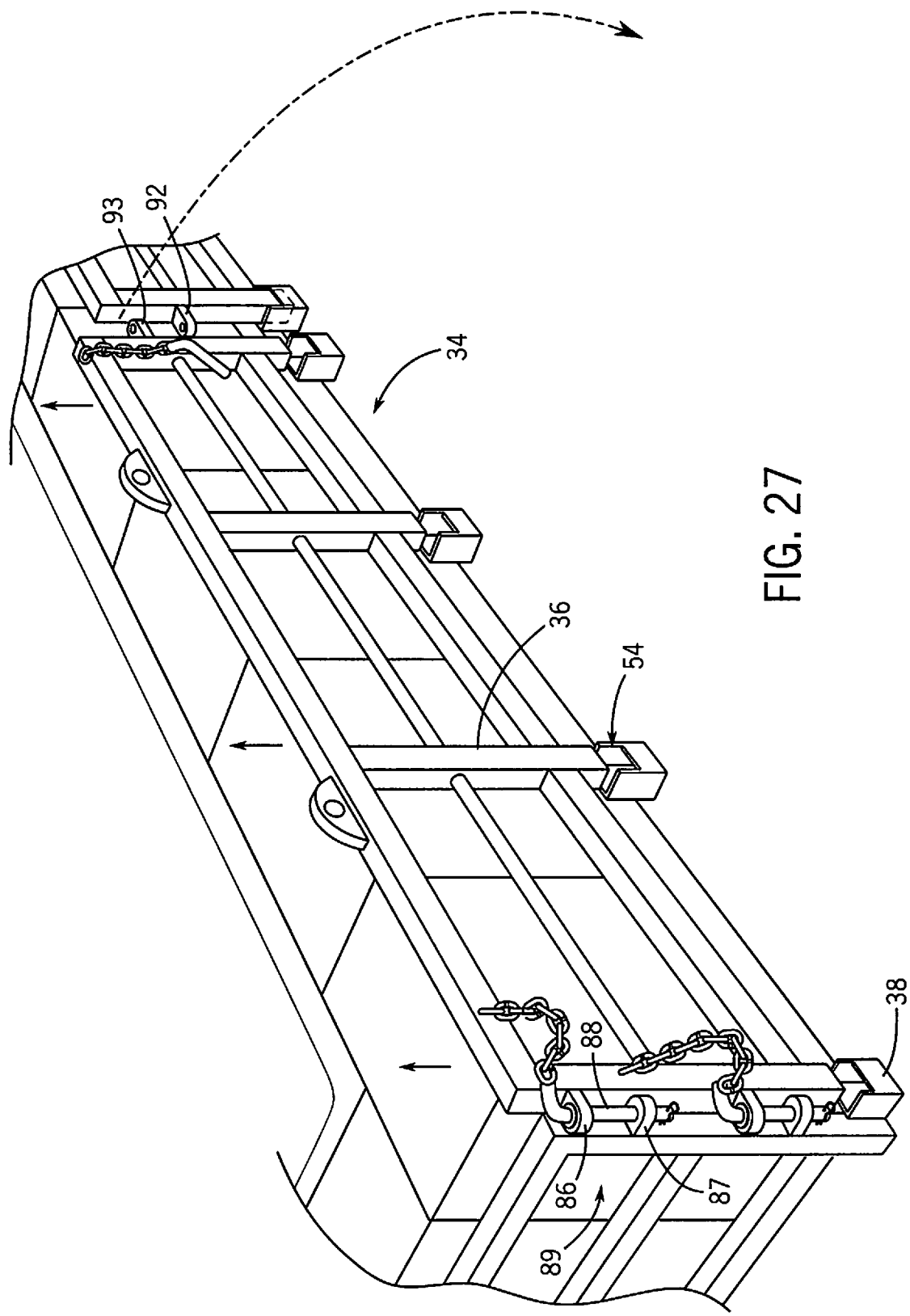
FIG. 27 is a partial perspective view of the apparatus of FIG. 17 and of an alternative for the apparatus FIG. 1.

As shown in FIG. 21, segment 34 is in a set or resting position such that post 36 rests within socket 38. With reference to FIG. 27, segment 34 is lifted upward in the direction of the arrows such that component 86 is no longer in contact with component 87 or such that a gap exists between the components 86, 87. Such arrangement allows segment 34 to be lifted upward while hinge 89 is still configured to operate for allowing segment 34 to rotate outward from sled 20, 200 as shown with reference to the outward arrow and about lift pin 88. Thus, a worker setting up sled 20, 200 opens segments 34 to provide access to insert and/or remove filter media 60, 62. Otherwise, removal of a segment 34 typically requires more than one person to lift segment 34 from sockets 38. The use of a hinge 89 allows a single worker to open the segments 34 to fill or replace filter media such as straw bales 62. Lifting of segment 34 causes pivot pin 88 to translated upward within through holes of components 87 to provide a clearance for posts 36 to be removed outward from sockets 38. In one aspect, socket 38 defines a notch 54 which operates as a passageway for post 36 to be released from socket 38. For instance, when segment 34 is in an unlifted position such that post 36 sets relatively deep within socket 38. When segment 34 is lifted, pivot pin 88 slides upward within second hinge component 87 to provide clearance for post 36 to be swung outward from socket 38 through notch 54.

Figure 22:
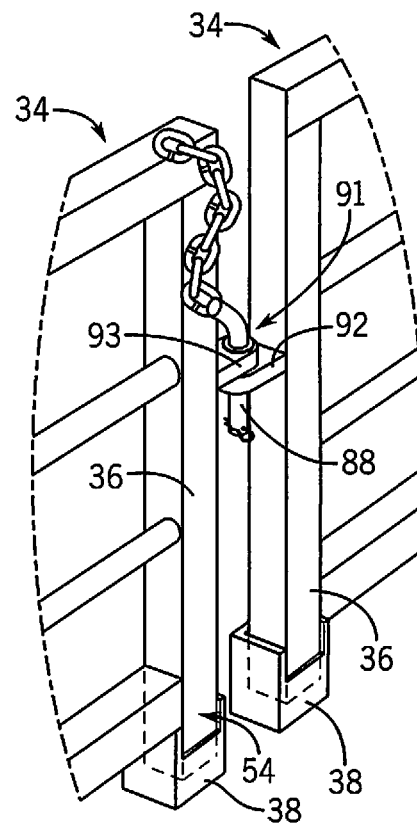
FIG. 22 is a partial close-up perspective view of FIG. 17 and of an alternative for the apparatus of FIG. 1.

FIG. 22 is a partial perspective view showing a second post 36 of segment 34 positioned within a second socket 38 where the socket 38 includes a notch 54 to provide clearance for post 36 to swing outward. Thus, a worker for instance may grasp segment 34 with both hands, pick upward to release posts 34 from sockets 38, and swing segment 34 outward (See FIG. 27) to gain convenient access to an inner portion of sled 20, 200. Once post 36 clears socket 38, segment 34 may slide downward such that hinge component 86 rests upon hinge component 87 so that segment 34 may rotate outward without having to hold segment 34 from falling despite having a post 36 removed from supporting socket 38. FIG. 22 also shows latch 91 having a first latch component 92 having a through hole aligned with a through hole of second latch component 93, and a pin 88 inserted therethrough. As shown in FIG. 22 the components 92, 93 are aligned together which is the case when posts 36 are fully set within sockets 38. When segment 34 is lifted such that components 86, 87 are separated as in FIG. 27, components 92, 93 will also be separated to accommodate for rotation about pivot pin 88. A chain is included to secure pivot pins 88 onto segments so that pins 88 are not lost. Removal of the cotter pin allows for complete removal of the pin 88 from components 86, 87 in order to completely remove segment 34 from sled 20, 200. The hinge 89 structure and sockets 58 with notches 54 may be used on sled 20 or sled 200 or other sleds or trailers as desired.

In further reference to FIG. 18, a slide bracket 55 is mounted to a front portion of sled 20, 200. Slide bracket 55 includes a port configured to receive a hook or a cable or strap from a vehicle or tool or machine to slide sled 20, 200.

Figure 23:
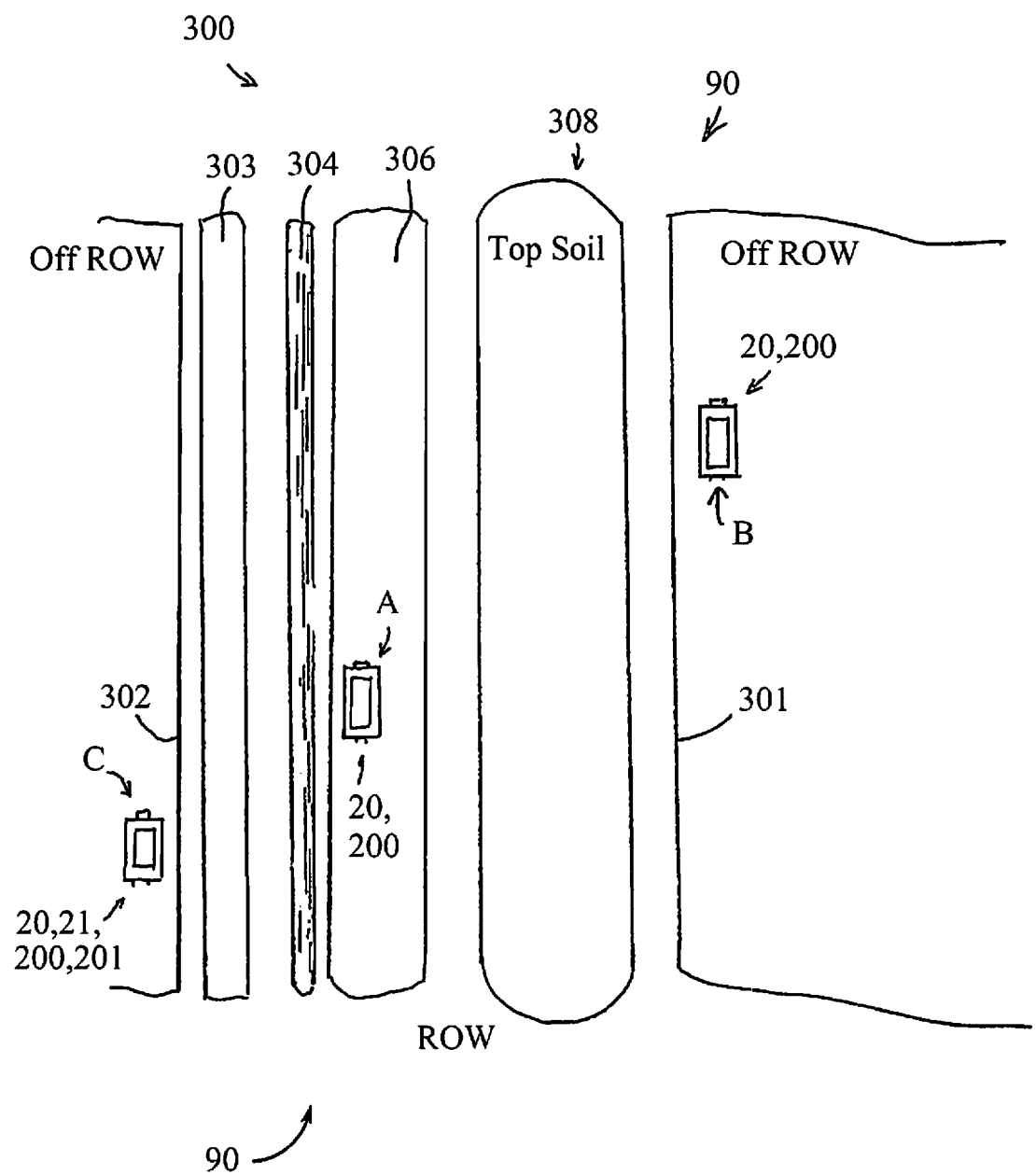
FIG. 23 is a plan view in accordance with further aspects of the invention.

FIG. 23 is a plan view in accordance with a method aspect 300 of the invention and depicting a sled 20, 21, 200, 201 located at various representative locations in relation to a parcel of land 90. In one aspect land parcel 90 is the location of a construction site having at least one right of way boundary line 301, 302. In this example the construction site is positioned between a first right of way (ROW) boundary line 301 and a second right of way boundary line 302. The space between the boundary lines 301, 302 may represent, for instance, an area of land where construction is permitted. If construction or access is desired at a position off right of way (Off-ROW), i.e., outside of or beyond the right of way boundary line, permission of the owner of the off right of way property is required. Obtaining permission for temporary access and/or use of property off the right of way (Off-ROW) is not always easy or feasible, and often requires a payment. Where there are no or limited options for setting up a dewatering or liquid treatment facility on the construction site itself, request may be made of an owner of the Off-ROW property to establish a dewatering facility.

In some instances it is desirable to remove liquids pooled in a ditch 303 or other location so that additional construction may proceed within the ditch 303 or other location. It is necessary to remove the liquids for such construction. While the liquid may be pumped from the ditch 303, there are requirements on where or how the pumped liquid may be disposed. For instance, some regulations may require the removed liquid to pass through at least two levels of treatment before the liquid is reintroduced to the environment. Sometimes the removed liquid must be placed in a pool, at least temporarily. These regulations are often used to reduce pollutants, sediments and soils from traveling to unwanted areas. Thus, a dewatering retention location needs to be established. As noted above, prior art dewatering retention locations often involved staking straw bales on the ground and around a filter bag which receives the displaced liquid. In some cases, there are few options on where to locate such retention locations. Permission may be obtained to establish the retention location Off-ROW. However, this can be expensive and time consuming to negotiate. Even if an Off-ROW location is used, a clean-up crew is nonetheless required to remove and clean-up the retention location after the construction. In some cases the clean-up crew does not attend to the clean-up task for many days, weeks, or months after use of the retention facilities. In the meantime, the bales and stakes remain on the Off-ROW property, creating a nuisance and hazards. In some cases the Off-ROW property owner will be a farmer who will work the land and experience the used debris from the construction site. The used retention facility may be overgrown or covered with weeds or other vegetation, creating mounds and leaving behind unwanted stakes and other debris. This does not reflect favorably upon the contractors working the construction, and makes it difficult to obtain future permissions.

In further cases, where the retention facility is placed within the ROW, the facility must also be removed after construction, and brings the same clean-up concerns. In even further cases, a retention facility needs to be set-up despite having to dewater only a small volume of liquids. It might take 30 minutes to setup an acceptable dewatering facility only to run the pump 5 or 10 minutes to dewater the construction location. Still further, in some instances, the retention facility is placed on a portion of the construction site that must also be dewatered at another time. Thus, the liquids are being transported more than once. It is not uncommon for multiple retention facilities to be constructed and removed, whether on ROW or Off-ROW, in order to undertake dewatering of a site.

In some cases a construction site will be established for construction of a pipeline. As shown in FIG. 23, one example of a pipeline construction project is shown. A pipe 304 is constructed and waiting for insertion into the ditch 303. Next to the pipe 304 is a travel lane 306 upon which travels equipment for construction of the pipeline and transport of equipment and materials. In some cases a dewatering facility is constructed on the travel lane 306. Heavy equipment such as cranes and backhoes and dump trucks, tractors and trailers, and other machinery travel upon travel lane 306. A crane or series of cranes are often located on the travel lane to lift and set the pipe 304 into the ditch 303. In some cases a reserve land portion 308 is provided which is positioned between the travel lane 306 and boundary line 301. Reserve land 308 is to be undisturbed during construction such that heavy equipment may not travel upon land 308. In many cases, topsoil and other soils from the site are stored on reserved land 308. For instance, top soils or other soils from the ditch 303 or travel lane 306 may be stored on reserved land 308. Dewatering facilities are not supposed to be located on reserved land 308. The topsoil and other soils are often used to reclaim the construction site ditch and travel lane, etc. In some cases, a dewatering facility is established Off ROW by gaining permission from the owner. Yet due to the presence of the reserved land 308, establishment of such treatment facilities is more difficult because the reserved land 308 must not be disturbed (nor crossed by heavy equipment, etc).

Under the present method use of the Off-ROW is made easier, in terms of obtaining permission to use the land and in terms of actual use of the land (and lack of clean-up). In one aspect, disclosed is a method of arranging a liquid treatment facility on Off-ROW land where the sole machinery used for arranging the facility is a machine having a hydraulic piston (or other machinery configured for lifting) to assist in placing the facility on the Off-ROW parcel without having the machinery positioned on the Off-ROW parcel. The machinery is used in part to lower the facility onto the Off-ROW parcel.

Figure 24:
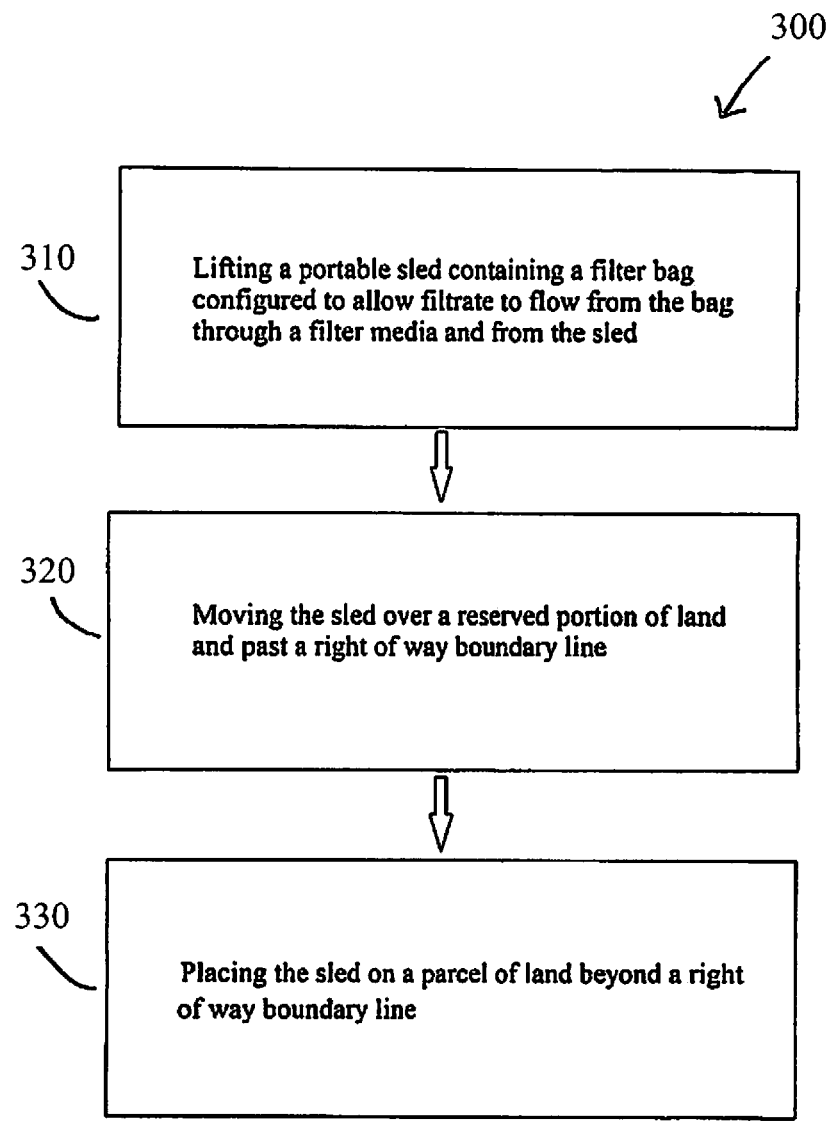
FIG. 24 is a flow diagram in accordance with a method aspect of the invention.

Referring to the flow diagram of FIG. 24, one aspect of a method 300 of arranging a facility, such as sleds and systems 20, 21, 200, 201 to treat liquid at a location beyond a right of way (Off-ROW) boundary line 301, includes a step 310 of lifting a portable sled 20, a step 320 of moving the sled, and a step 320 of placing the sled. The lifting step 310 includes lifting a sled 20, 200 containing a filter bag 58 configured to allow filtrate to flow from the bag 58 through a filter media 60, 62, and from the sled 20, 200. The moving step 320 includes moving the sled 20 past a right of way boundary line 301. In one aspect the moving step 320 includes moving the sled 20 over a reserve portion of land 308. The moving of the sled 20 occurs without the moving equipment traveling upon the reserved land 308. For instance a crane may lift sled 20, traverse along travel lane 306, move the sled 20 across reserved portion of land 320 without contacting the land 320, and place the sled on the other side of the reserved land 308 and upon the Off-ROW land. The placing step 330 includes lowering the sled downward 20 until it rests upon the Off-ROW. Adjustments may be made to the sled 20 by picking up the sled and replacing it or adjusting it by sliding as needed. Where a crane or other machinery is used, cables are attached to lift eyes 72, for instance. In one aspect a set of four cables is connected to the set of lift eyes 72. The four cables combine to a single cable which leads to a winch or drum spun by the crane to wind up the cable in order to pick-up the sled 20. A piston or other mechanism may also be used on the crane or other machinery to adjust a telescoping or extending boom of the machinery to locate a terminal end of the boom over the center point or a center area of the sled in to achieve a balanced lifting action as is common. Activating the machinery the cable to lift the sled 20 straight upward so that it may be picked or lifted from the ground and placed back down onto the ground at a different location and in one aspect at an Off-ROW location. The lifting may also be undertaken to slide or partially slide sled 20 along the ground. As shown in FIG. 23, a sled 20 is located on travel lane 306 within the ROW at position "A". A crane or other lifting machine lifts the sled 20 from position A and transfers the sled 20 to position B located beyond the boundary line 301 and Off-ROW. The crane may swing the sled 20 and simply place it Off-ROW. The crane may also travel along the travel lane 306 to place sled anywhere Off-ROW or on ROW as desired. Such picking and placing allows for great flexibility in coordinating construction. Use of sled 20, 200 and systems 21, 201 also makes for efficient set-up or a treatment facility which is swiftly positioned and ready to operate. Piping 70 and pumps may be positioned adjacent areas to be dewatered, with the piping 70 running to the sled 20 for treating the pumped liquids. A sled 20 or multiple sleds 20 may be positioned at various locations on the ROW or Off-ROW as desired, including at position "C" where a sled is located Off-ROW (i.e., beyond boundary line 302). Sleds 20 may be positioned so that water runoff is directed to desired areas and to minimize having to pump the water more than once. In further aspects a sled 20 may be dragged by hooking onto slide bracket 55 for instance and sliding the sled 20 along travel lane 306. A truck or other vehicle may simply attach a hook to slide bracket 55 and drive the sled 20 to a new location upon travel lane 306 or to other locations. Other machinery may pick up sled 20 and move and/or slide the sled as desired. The above transporting of the sled 20 is accomplished quickly, thereby allowing efficient arrangement of treatment facilities. Because a facility may reuse the filter bag 58 and filter media 60, 62, there is a cost saving due to use of less materials. There is also a significant cost savings in terms of man-hours under the present methods compared to appropriately arranging facilities using prior methods or devices (forgoing both set-up and clean-up labor).

Due to the nature of the preset apparatuses, systems and methods, obtaining permission to use Off-ROW parcels is easier. Because there is little or no debris left behind on Off-ROW property, there is less negative impact on the property and environment. The facility is quickly moved from the Off-ROW. The Off-ROW parcel is minimally disturbed, because machinery does not have to travel on the Off-ROW, and bales and stakes need not be placed on the Off-ROW parcel. All of this is presents easier circumstances for negotiating terms of use of the Off-ROW.

In further aspects the method includes utilizing the sled 20, 200 in different construction locations for different and a variety of construction projects. The lower-profile sled 200 accommodates swift placement and a relatively small footprint for assembly of a treatment facility. General contractors may utilize the systems 21, 201 in non-pipeline projects, such as when building houses, apartment buildings, commercial buildings, or remodeling of buildings, the construction or repair of roadways, bridges, dams or other projects requiring landscaping or where water/liquid tends to pool and requires dewatering. The sled 200 in one aspect may comprise a base 22' having dimensions similar to the base 22 of sled 20, and may be transported on a flatbed truck. In alternatives, the sled 200 has a smaller footprint and is more easily transported.

Figure 25:
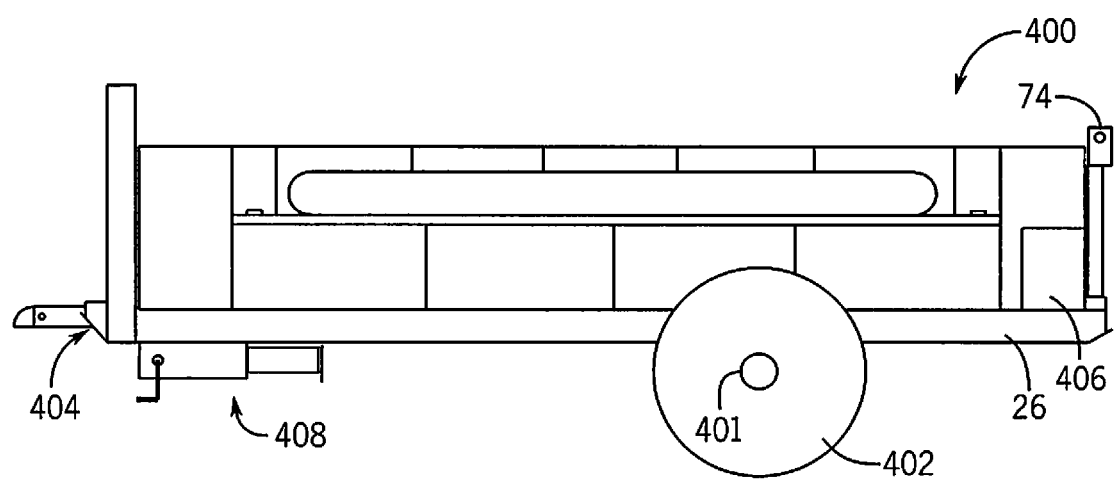
FIG. 25 is a side illustration view of an apparatus made in accordance with a further aspect of the present invention.

In a further aspect, apparatus or sled 400 is a trailer configured to be pulled behind a vehicle. Trailer or sled 400 as shown in FIG. 25 is similar to sled 200 but having an axle 401 or axles and wheels 402. FIG. 25 shows sled 400 in partial cut-away with visibility to bales 62 and filter bag 58 and lift frame 80, and pump 406. Other arrangements of the bales and filter bag and pump are contemplated. Trailer 400 includes a hitch receiver 404 configured to receive a hitch or hitch ball for connecting trailer 400 to a truck such as a pickup truck. In further aspects a pump 406 (and engine to power the pump) and piping 70 are included on or with the trailer 400. In aspects, trailer 400 includes skids 26 so that when wheels and axles are removed, trailer 400 may be dragged. In aspects trailer 400 also includes lift eyes 72 and/or lift arms 74. If trailer 400 happens to get stuck in the mud or soil, it may be lifted using lift eyes 72 or arms 74 or dragged with the assistance of skids 26. In some aspects, a smaller version of trailer 400 utilizes smaller bags 58 as compared to apparatus 20, 200, and may also utilize smaller pumps and smaller bales (or may also use an Example Bale as desired, or use other standard bales, or filter socks). Trailer 400 may include a swing leg 408 which swings into position so that trailer 400 can rest on swing leg 408 and wheel 402 in a stable and/or level arrangement when not attached to a truck. Swing leg 408 swings into a storage position as shown in FIG. 25. In alternatives, Trailer 400 may include a double axle (or multiple axles) and multiple sets of tires or wheels 402 depending on the size of the load.

In further aspects the apparatuses and systems may include leveling feet which extend from sled 20, 200 to accommodate leveling of the sled or trailer. Leveling feet may include a jack or ratchet mechanism for mechanical adjustment. Leveling feet may be mounted to sled at each of the four corner areas of the sled.

In further aspects, multiple filter bags 58 may be positioned on sled 20, 200, 400. Alternative dividers may be placed within the interior of sled 20, 200, 400 to create separate filter mechanisms, including separate or combined pooling areas and spillways. Multiple piping and pumps may be used to supply the multiple filter bags 58 with liquid from a site to be dewatered. A central wall may be used to generally divide the interior of the sled 20, 200, 400, with each divided section containing a separate filter bag 58. A central wall may be removable. In one aspect the wall may include a liner sheet 56 placed between filter bags and oriented generally vertically to create a pooling section. Pumps and engines and piping may also be added to the sled 20, 200, 400 to accommodate efficient use and set-up. In aspects, sled 20, 200, 400 is made of metal such as steel, and in further aspects, alternative materials may be used, including different metals, aluminum, PVC, polymers, plastics, composites, whether for the sled 20, 200 itself or for its components.

It should be understood, of course, that the foregoing relates to exemplary embodiments of the invention and that modifications may be made without departing from the spirit and scope of the invention as set forth in the following claims.

What is claimed is:

1. A method of treating contaminated liquids, comprising:
receiving a contaminated liquid within a filter bag positioned within an interior fence of a portable apparatus, the filter bag positioned over a base of the portable apparatus for capturing contaminants within the bag while allowing filtrate to pass through the bag; and allowing filtrate passing through the filter bag to pass the interior fence and through a containment channel having a filter medium, the filtrate passing through the containment channel passing an exterior fence connected to the portable apparatus.

2. The method of claim 1 further comprising containing the filtrate, at least temporarily, upon a liner sheet positioned beneath the filter bag and extending upward from the base.

3. The method of claim 1 further comprising:
transporting the portable apparatus from a first construction site location to a second construction site location while retaining the filter bag within the interior fence.

4. The method of claim 1 where the portable apparatus includes longitudinally oriented skids positioned below the base, the base being sealed such that liquid is not able to pass therethrough, and where the exterior fence includes a front segment rigidly connected to the base and having a tongue configured to receive an arm of a roll off truck for transporting the portable apparatus, the method further comprising transporting the portable apparatus from a first location to a second location while retaining the filter medium within the containment channel.

5. The method of claim 1 further comprising lifting the filter bag from the portable apparatus utilizing a porous lift frame positioned beneath the filter bag, the porous lift frame being such that liquid passes therethrough.

6. The method of claim 1 where the filter medium includes a straw bale positioned on the base between the interior fence and the exterior fence.

7. The method of claim 1 where the base is a sealed base such that liquid is not able to pass therethrough, the filter bag positioned on or above the base and within an internal area bounded by the interior fence.

8. The method of claim 1 where the exterior fence is positioned about a perimeter of the base and comprises a plurality of spaced-apart vertical posts connected to the base and a plurality of horizontal structures spanning the distance between adjacent vertical posts thereby forming segments having sufficient structure to hold the filter media while also allowing liquids to pass outward between adjacent vertical posts, the interior fence having a plurality of spaced apart inner vertical posts and a plurality of horizontal rungs spanning the distance between adjacent inner vertical posts thereby forming segments allowing liquid to pass between adjacent vertical inner posts and into the secondary containment channel.

9. The method of claim 1 further comprising placing the apparatus on ground, the filtrate passing the exterior fence flowing to the ground.

10. The method of claim 1 where the exterior fence includes multiple fence segments, at least one of the multiple fence segments includes a first post which removeably inserts into a first socket connected to the apparatus and a second post which removeably inserts into a second socket.

11. The method of claim 1 where the apparatus includes multiple fence segments positioned around a perimeter of the base, at least one of the multiple fence segments includes a first post which removeably inserts into a first socket and a second post which removeably inserts into a second socket, the first socket includes a first notch and the second socket includes a second notch, the first post includes a first hinge component, the first hinge component receiving a first pivot pin, the first pivot pin slidable within a second hinge component such that lifting the first post upward causes the first pivot pin to slide upward within the second hinge component and positions the second post such that the second post passes the second notch to allow the at least one of the multiple fence segments to rotate outward from the apparatus about the first pivot pin.

12. The method of claim 1 where the filter medium includes a straw bale positioned on the base between the interior fence and the exterior fence, the filter bag positioned on or above the base and within an internal area bounded by the interior fence, a liner sheet positioned below the filter bag and extending above the straw bale.

13. The method of claim 1 further comprising lifting the portable apparatus from a position on a right of way side of a right of way boundary of a parcel of land and placing the apparatus on the parcel of land beyond the right of way boundary.

14. The method of claim 13 where the lifting step includes lifting the apparatus from a travel lane located on the right of way side, the method further comprising moving the apparatus in a spaced relationship over a reserved portion of land and past the right of way boundary, the placing step including setting the apparatus downward upon the land utilizing a hydraulic piston or a winch to lower the apparatus.

15. The method of claim 1 where the base is a sealed base such that water is not able to pass therethrough, the portable apparatus having at least one lift hook having a through hole for receipt of a pin or cable or strap to secure to a boom, hoist, crane or lift arm in order to pick-up the portable apparatus, the method further comprising picking up the portable apparatus utilizing the lift hook.

16. The method of claim 1 where all liquid received within the filter bag is received via a single conduit connected to the filter bag.

17. A method of treating contaminated liquids, comprising:
receiving contaminated liquid within a filter bag positioned over a substantially planar lift frame, the lift frame being porous such that liquid passes therethrough, the lift frame positioned over a base of a portable apparatus, the filter bag being such that filtrate passes through the filter bag and such that contaminants are captured therein;

allowing filtrate passing through the filter bag to pass through a filter medium placed over the base; and lifting the lift frame to remove the filter bag from the apparatus.

18. The method of claim 17 where all contaminated liquid received within the filter bag is received via a single conduit connected to the filter bag.

19. The method of claim 17 where the filter medium is a straw bale.

20. The method of claim 17 where the filter medium includes a straw bale placed on the base between an interior fence and an exterior fence, the filtrate passes through the exterior fence to the ground.

21. The method of claim 17 where the base is a sealed base such that liquid is not able to pass therethrough.

22. The method of claim 21 where the apparatus includes an exterior fence having a top rail comprising a lift eye having a through hole for receipt of a pin or cable or strap to secure to a boom, hoist, crane or lift arm in order to pick-up the apparatus, the method further comprising picking up the apparatus utilizing the lift eye.

23. The method of claim 17 where the lift frame is made of metal.

24. The method of claim 17 where the lift frame is generally rectangular and includes a portion made of expanded metal.

25. The method of claim 17 where the lift frame is configured to retain a level orientation when lifted.

26. A method of treating contaminated liquids, comprising:
   receiving a contaminated liquid within a filter bag positioned over a lift mechanism, the lift mechanism being porous such that liquid passes therethrough, the filter bag removing at least some contaminants as liquid passes therethrough, producing a filtrate, the lift mechanism positioned over a base of a portable apparatus;
   allowing the filtrate passing through the filter bag to pass through a filter medium placed over the base and having a plurality of fence segments extending from the base adjacent the filter medium; and
   lifting the lift mechanism to remove the filter bag from the portable apparatus.

27. The method of claim 26 where all contaminated liquid received within the filter bag is received via a single conduit connected to the filter bag.

28. The method of claim 26 where the filter medium is placed on the base in a channel between the plurality of fence segments and another plurality of fence segments, the filtrate passes through the fence segments to the ground.

29. The method of claim 26 where the lift mechanism is a generally planar metal lift frame.

* * * * *